(12) United States Patent
Takahashi et al.

(10) Patent No.: US 6,281,983 B1
(45) Date of Patent: *Aug. 28, 2001

(54) IMAGE FORMING APPARATUS HAVING A PREVIEW FUNCTION FOR PREVENTING AN IMAGE ON A DISPLAY PRIOR TO PRINTING

(75) Inventors: Hiroyuki Takahashi; Toshiyuki Kitamura, both of Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/679,987

(22) Filed: Jul. 15, 1996

(30) Foreign Application Priority Data

Jul. 20, 1995 (JP) .................................................... 7-184186
Dec. 11, 1995 (JP) .................................................... 7-321650

(51) Int. Cl.[7] ......................... H04N 1/387; G03G 15/00; B41B 15/00
(52) U.S. Cl. ......................... 358/1.2; 358/452; 358/453; 399/85
(58) Field of Search .................... 358/400, 404, 358/434, 442, 444, 468, 443, 530, 450, 540, 448, 1.14–1.17, 1.1, 1.2, 452, 453, 449, 451; 399/69–70, 81, 85–87; 382/284; H04N 1/40, 1/32

(56) References Cited

U.S. PATENT DOCUMENTS

| | | | | |
|---|---|---|---|---|
| 5,467,202 | * | 11/1995 | Washio et al. | 358/404 |
| 5,485,283 | * | 1/1996 | Kaneko | 358/530 |
| 5,644,407 | * | 7/1997 | Watanabe et al. | 358/434 |
| 5,644,411 | * | 7/1997 | Tamagaki et al. | 358/529 |
| 5,655,177 | * | 8/1997 | Kato | 399/69 |
| 5,721,624 | * | 2/1998 | Kumashiro et al. | 382/284 |
| 5,732,230 | * | 3/1998 | Cullen et al. | 358/450 |
| 5,745,664 | * | 4/1998 | Nomura et al. | 382/284 |

* cited by examiner

Primary Examiner—Kimberly A. Williams
(74) Attorney, Agent, or Firm—Fitzpatrick, Cella, Harper & Scinto

(57) ABSTRACT

In a mode of continuously forming different images, such as a serial page copy mode and an enlargement serial copy mode, which of the images are to be formed, and how they are to be formed is previewed prior to the start of a copy operation. At an operation unit an operator sets a selected mode, for example, the serial page copy mode, by sequentially depressing a preview key and an image reading key to supply image data to a preview processing unit which displays the output image on a CRT prior to printing. The output images may be displayed in the order to be copied. The output images may also be collectively displayed on the same screen, or the continuous display during preview may be temporarily interrupted or resumed at a desired timing.

32 Claims, 46 Drawing Sheets

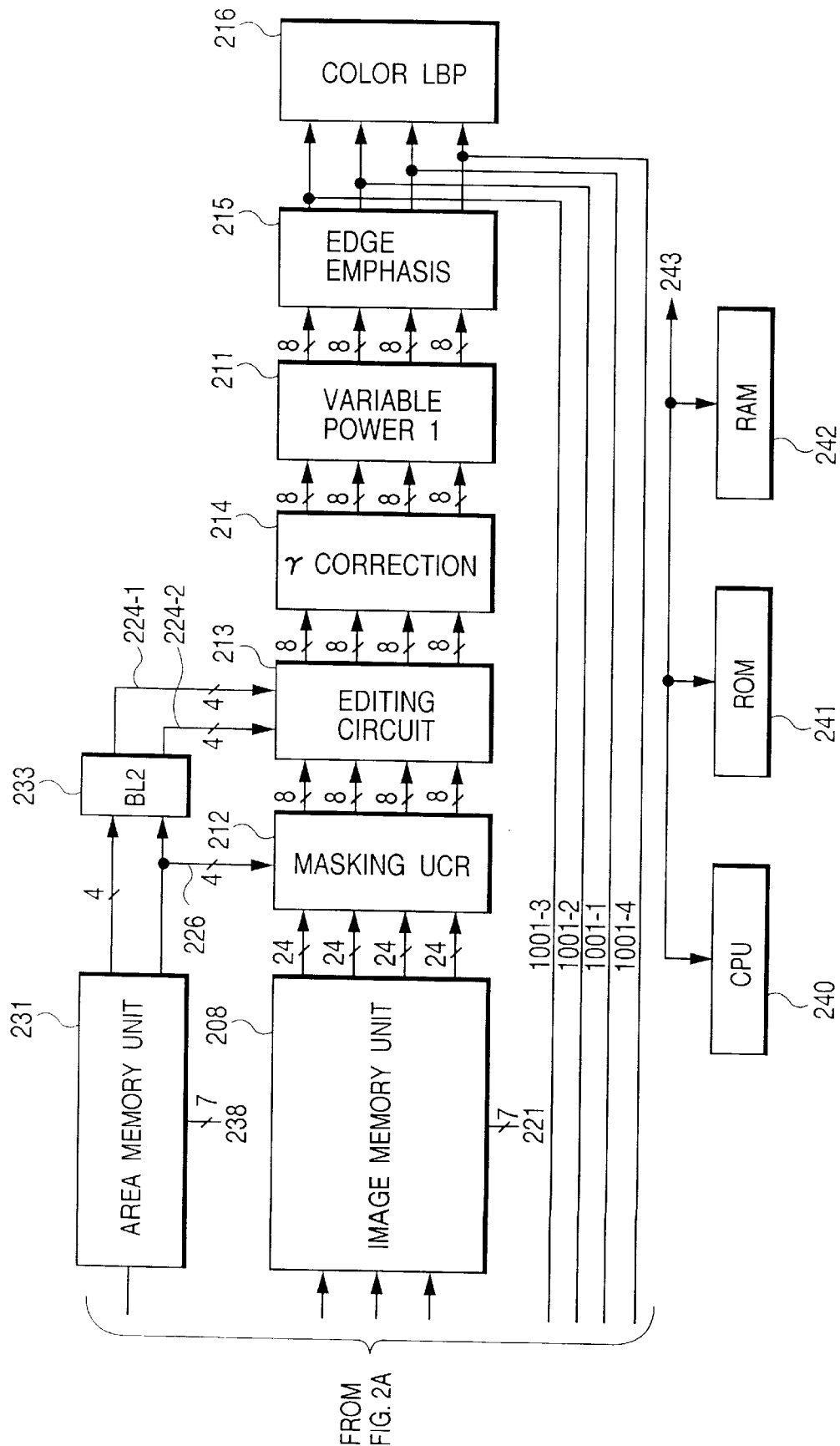

FIG. 35
WHEN LEFT-SIDE PAGING
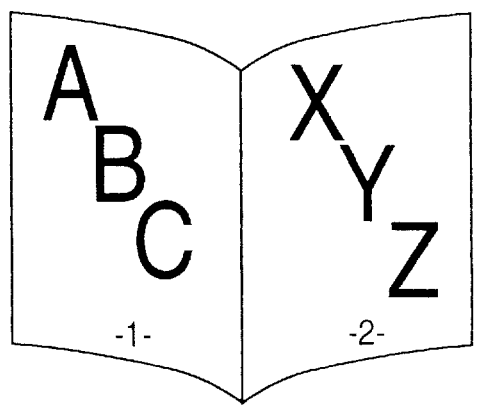
DISPLAY (1)
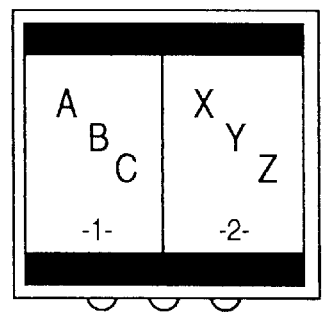
DISPLAY (2)
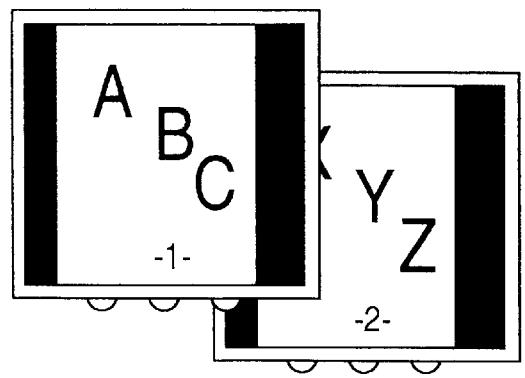
PRINT IMAGE
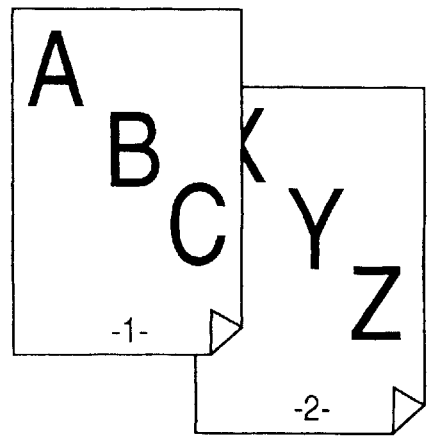

FIG. 36
WHEN RIGHT-SIDE PAGING
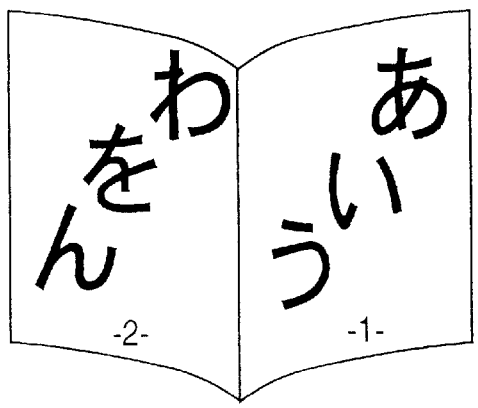
DISPLAY (1)
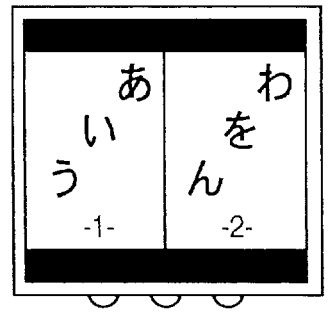
DISPLAY (2)
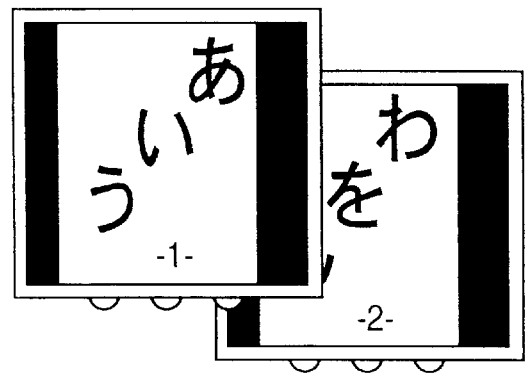
OUTPUT IMAGE
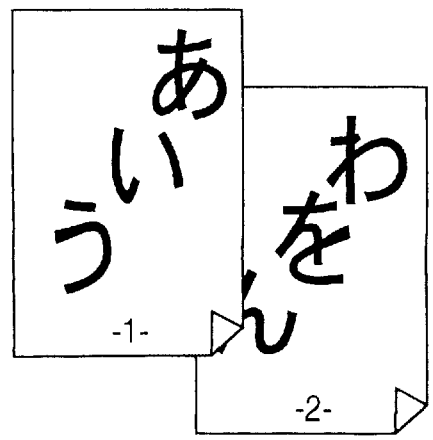

FIG. 39
WHEN LEFT-SIDE PAGING
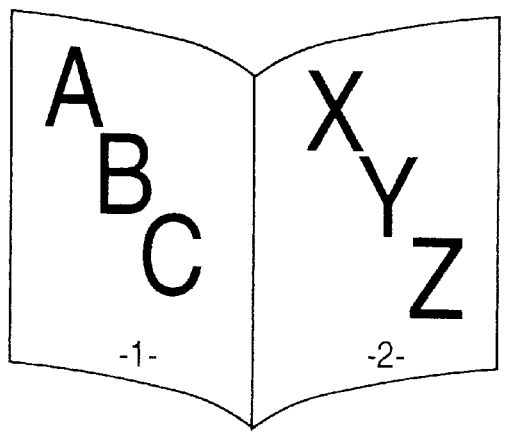
DISPLAY (1)
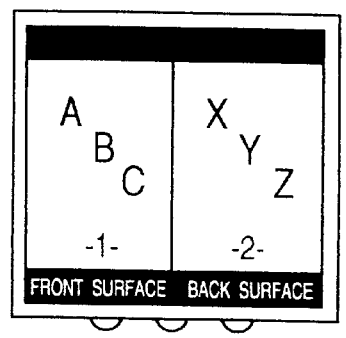
DISPLAY (2)
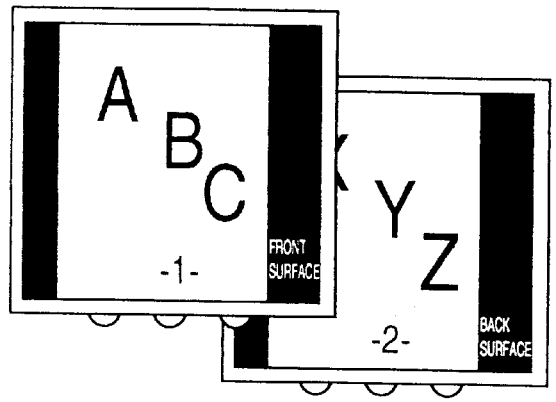
OUTPUT IMAGE
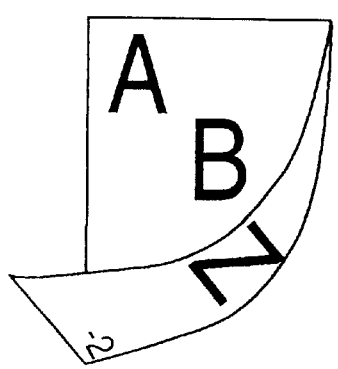

IMAGE FORMING APPARATUS HAVING A PREVIEW FUNCTION FOR PREVENTING AN IMAGE ON A DISPLAY PRIOR TO PRINTING

BACKGROUND OF THE INVENTION

1. Field of the Invention

The present invention relates to an image forming apparatus having a preview function for previewing an image before it is printed out.

2. Related Background Art

High image quality and sophisticated functions of digital color copiers are becoming more common. A color adjustment process and an editing process for an output image at present meet most of requirements of users. Copiers having a so-called preview function are also being manufactured. With this preview function, instead of printing out an image several times in order to confirm the edited image or adjusted color, an image is displayed on a CRT or the like for confirmation of such editing and adjustment.

There are copiers having a monochrome liquid crystal display. For a color copier, however, a preview system of full-color is desired in order to adjust colors.

One example of a preview system is shown in FIG. 45. Blocks 1101 to 1109 constitute a full-color copier, and blocks 1110 to 1111, and 1219 constitute a preview system.

In FIG. 45, reference numeral 1101 represents an RGB output sensor for reading a reflection original, reference numeral 1102 represents an S/H and A/D converter, reference numeral 1103 represents a shading correction circuit, reference numeral 1104 represents an input masking circuit, reference numeral 1105 represents a LOG converter circuit, reference numeral 1106 represents a masking UCR for adjusting the colors to match the printer characteristics, reference numeral 1107 represents an image editing circuit for performing various processes such as trimming, masking, painting, and a variable power process, reference numeral 1108 represents an edge emphasis circuit, and reference numeral 1109 represents a printer unit for scanning a reflection original three or four times to print out a full-color image.

Reference numeral 1110 represents an image memory unit for storing image signals (RGB) after input masking 1104, reference numeral 1111 represents a memory control circuit for controlling the image memory 1110 (the memory control circuit having an address counter and controlling data transfer between an unrepresented CPU and image memory), and reference numeral 1219 represents a CRT for displaying data stored in the image memory. If a read image is simply displayed on a CRT, a desired editing process entered from an operation unit is not reflected in the image. Therefore, the system is configured so that data in the image memory 1110 can be accessed by an unrepresented CPU to perform the process equivalent to the circuit 1107 and display the final processed image.

High speed requirements for a digital full-color copier are steadfast. In order to meet the requirements, a color LBP has been proposed in which four photosensitive drums are used as shown in FIG. 1 and development units for Y, M, C, and K colors are used. Such a color LBP is necessarily required to have an image memory for correcting a spatial displacement among the drums. It is desired to have a full-page image memory in order to perform more sophisticated image processing.

As the image processing function attains a high quality, it is difficult to predict how an image is actually printed out. There may sometimes be a difference between the printed image and the predicted image, and unnecessary copies increase.

In a two-page separation mode of sequentially copying right and left pages of an opened original document, in a multi-page enlargement mode of dividing one original into a plurality of block regions and enlarging and copying an image of each block region on multiple sheets, or in a mode of sequentially forming an image on multiple sheets, it is difficult to know in what order each image is copied, and copied sheets are required in some cases to rearrange their order.

SUMMARY OF THE INVENTION

It is an object of the present invention to provide an image forming apparatus and a preview method capable of eliminating the above disadvantages.

It is another object of the present invention to provide an image forming apparatus with an image memory and a preview method capable of eliminating the above disadvantages, efficiently checking a final image, and reducing unnecessary copies as much as possible.

It is another object of the present invention to provide an image forming apparatus and a preview method capable of checking the image forming order in advance by displaying the images processed by the same image forming order on a display unit, in a specific mode of sequentially forming at least two images.

It is another object of the present invention to provide an image forming apparatus and a preview method capable of easily checking a plurality of images to be sequentially formed by displaying them on the same screen, in a specific mode of sequentially forming at least two images.

It is another object of the present invention to provide an image forming apparatus and a preview method capable of easily intercepting a preview of a plurality of images to be sequentially formed.

The above and other objects of the invention will become apparent from the following detailed description and the claims when read in connection with the accompanying drawings.

BRIEF DESCRIPTION OF THE DRAWINGS

FIGS. 35 and 36 are diagrams illustrating a preview in a serial page copy mode.

FIG. 39 is a diagram illustrating a preview in a two-side copy mode.

DETAILED DESCRIPTION OF THE PREFERRED EMBODIMENTS

Figure 1:
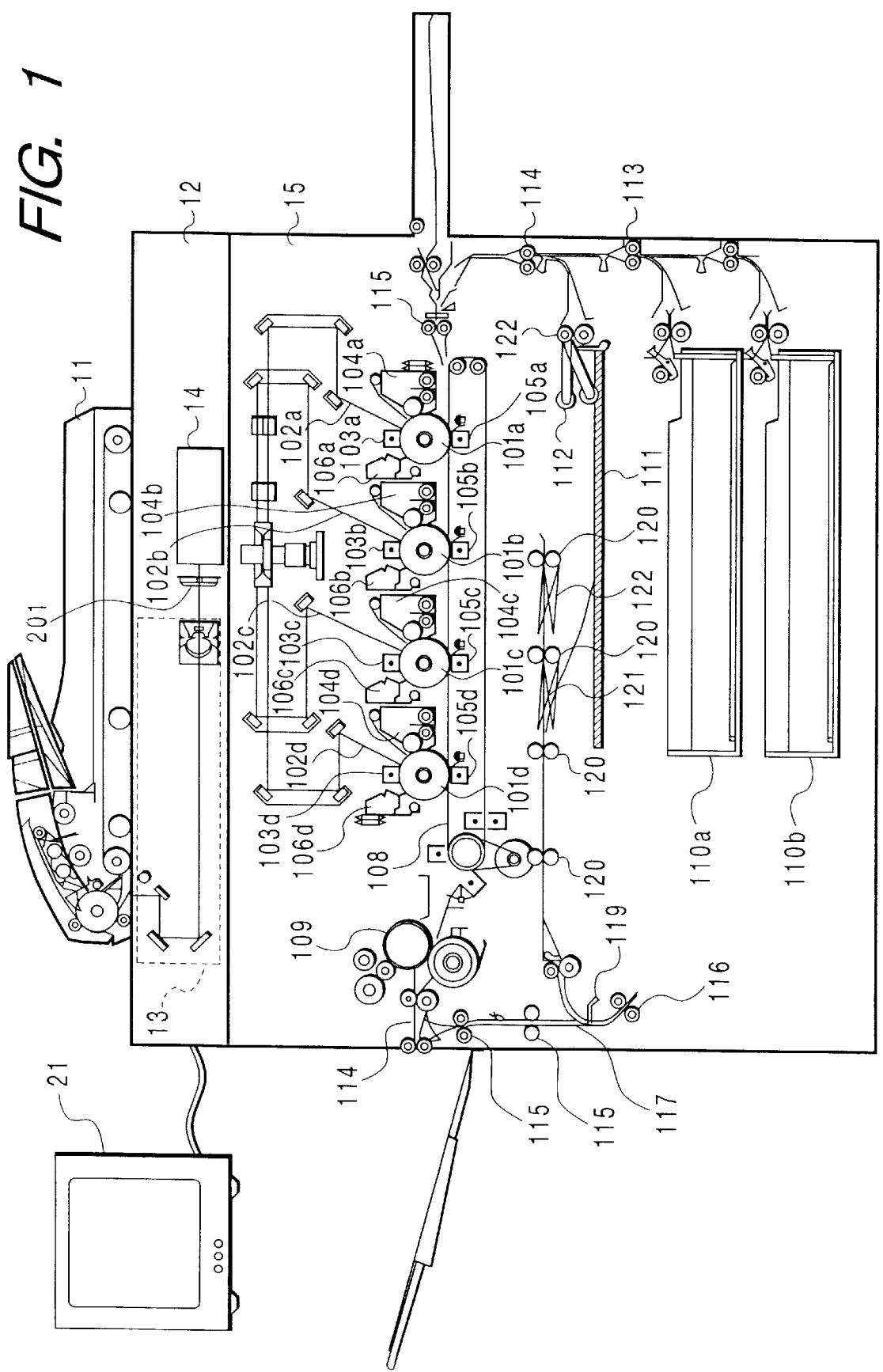
FIG. 1 is a cross sectional view of an image forming apparatus.

Embodiments of the invention will be described with reference to the accompanying drawings.
<Overall Structure of the System>

The system of an embodiment will be described with reference to FIG. 1. A document feeder (DF) unit 11 sequentially feeds a plurality of originals one after another to an exposure position on an original support of a reader unit 12. The reader unit 12 is constituted by an optical system 13 and an image processing unit 14. In the reader unit 12, an image of an original fed from the DF (automatic document feeder) unit 11 is scanned by the optical system 13 and focussed on a three-line CCD sensor 201 to convert it into image data which is subjected to various processes by the image processing unit 14 and output to a printer unit 15. The printer unit 15 forms an image synchronously with the timing of a transported recording sheet and, transfers the image to the recording sheet to form a full-color image.

Reference numeral 21 represents a display (CRT) used for the preview and is connected to the reader unit 12 by a NTSC interface and the like.
<Structure of Reader Unit>

Figure 2A:
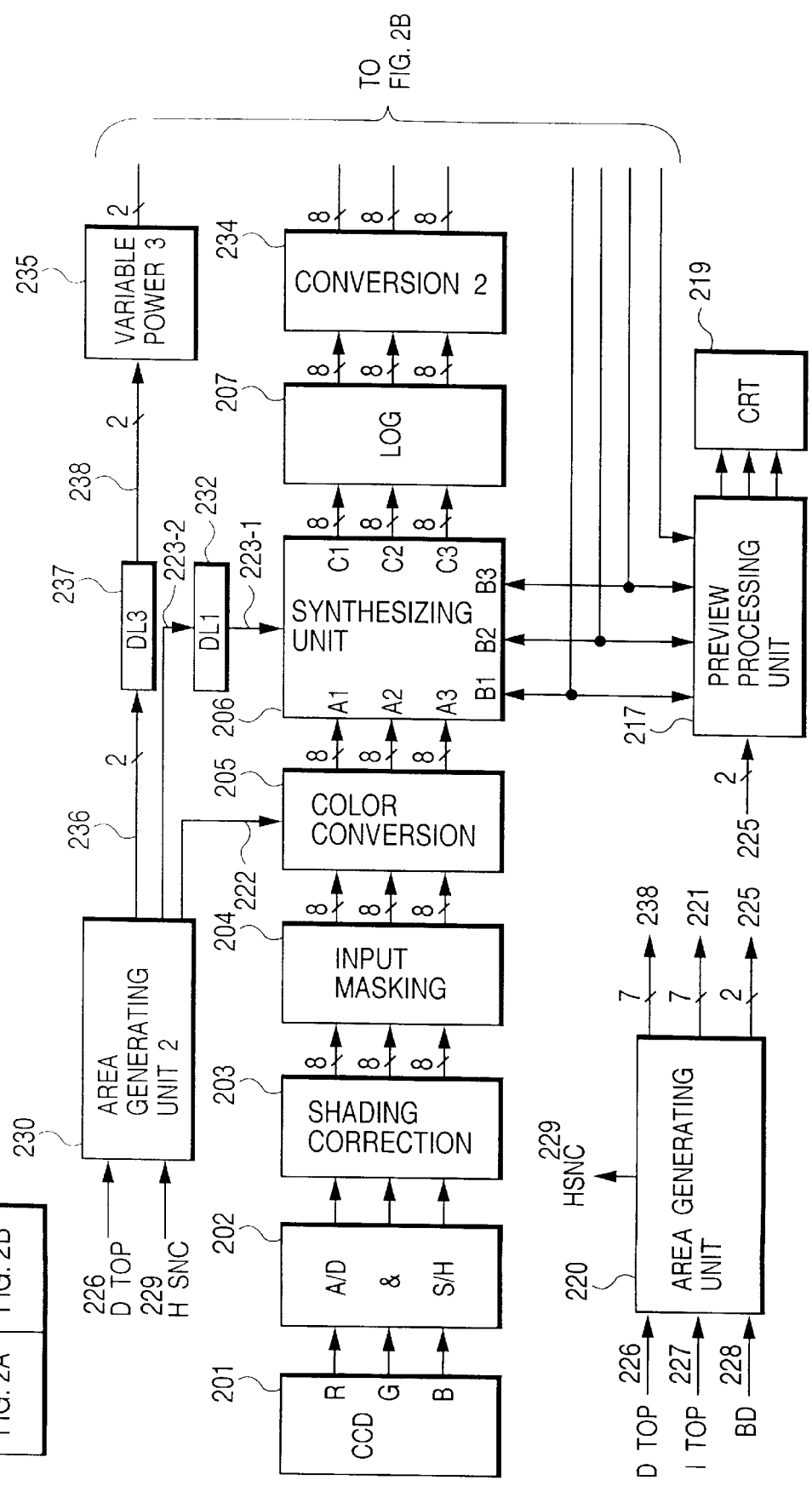
FIG. 2 which is comprised of FIGS. 2A and 2B is a block diagram showing the structure of a reader unit of the image forming apparatus.

FIGS. 2A and 2B are block diagrams showing a digital image processing unit of the reader unit 12. A color original placed on the original support of the reader unit 12 is exposed with a halogen lamp of the optical system 13. An image reflected from the original is picked up by CCD 201, output signals from which are sampled and held and thereafter converted by an A/D and S/H circuit 202 into three-color RGB digital signals. These color separated digital signals are subjected to a shading and black correction by a shading correction circuit 203, converted into a NTSC signal by a masking circuit 204, and color converted by a color conversion circuit 205 to supply the color converted signal to a synthesizing unit 206. The synthesizing unit 206 synthesizes the image data of a reflection original and the output data of an image memory 208, the synthesized result being subjected to a LOG correction process by a LOG conversion circuit 207 and to a variable power process (when a variable power is set) by a second variable power circuit 234. The variable power process is actually an enlargement process because the compression process by the image memory unit 208 operates as a low-pass filter. An output of the second variable power circuit 234 is input to the image memory unit 208.

The image memory unit 208 is constituted by three fields including a compression field, an image memory field, and an expansion field. CMY data (24 bits×4) before an output masking process corresponding to the four drums are read from the image memory unit 208.

Reference numeral 212 represents a masking UCR unit for generating color signals for the respective drums, the color signals matching the printer characteristics. Reference numeral 213 represents an editing circuit for a free color process and a paint process. The edited result is subjected to a gamma correction by a gamma correction circuit 214, to a variable power process (specifically, a reduction process) by a first variable power circuit 211, and to an edge emphasis process by an edge emphasis circuit 215, and is sent to a color LBP 216.

Reference numeral 217 represents a preview processing unit which is constituted by a CRT image memory for storing edited image data and a memory control unit for controlling the CRT image memory. Reference numeral 219 represents a CRT display for displaying data in the CRT image memory.

Reference numeral 220 represents an area generating unit to which are inputted a BD signal 228 output from LBP 216, an ITOP signal 227 generated in LBP 216 (during printer output, a sub scan enable signal synchronous with the rotation of each drum is generated in response to this signal), and a DTOP signal 226 output from the image front end sensor. In accordance with seven kinds of signals, including main scan synchronization signal 229, two kinds of write enable signals (a main scan write enable signal 227-1 and a sub scan write enable signal 227-2) and five kinds of read enable signals (a main scan read enable signal 227-3 and sub scan read enable signals 227-M, 227-C, 227-Y, and 227-K), the area generating unit 220 outputs: a signal 221 for controlling the image memory 208; signals 238 (a main scan write enable signal 238-1, a sub scan write enable signal 238-2, a main scan read enable signal 238-3, and sub scan read enable signals 238-M, 238-C, 238-Y, and 238-K) generated synchronously with the ITOP signal 227 while considering delays at the compression and expansion fields of the image memory 208 to adjust the timing of the image signal and an area signal.

Reference numeral 230 represents a second area generating unit for generating an area signal for each editing process. As will be described later, this unit is constituted by a bit map memory and a bit map memory controller (e.g., AGDC (Advanced Graphic Display Controller)) for controlling the bit map memory. A write operation is controlled by CPU 240, whereas a read operation is performed synchronously with an HSNC signal 229 and the DTOP signal 226 synchronizing with the scanning an original image.

A signal 205 is an enable signal of the color conversion circuit, a signal 223-1 is an enable signal of the image synthesis circuit, and a signal 236 is an enable signal of the free color mode or paint mode.

An area memory unit 231, delay circuits 232 (DL1), 233 (DL2), and 237 (DL3), and a third variable power circuit 235 (variable power 3) operate to adjust timing when the image signal and area signal are synchronized together.

Specifically, the delay circuit DL1 delays the output signal 223-2 of the area generating unit 230 by a process time required by the color conversion circuit 205. A pixel delay is achieved by a D-type flip-flop and a line delay is achieved by a FIFO memory.

The delay circuit DL2 delays the output signal 226 of the area memory unit 231 by a process time required by the masking UCR circuit 226. A pixel delay is achieved by a D-type flip-flop and a line delay is achieved by a FIFO memory.

The delay circuit DL3 delays the output signal 236 of the area generating unit 230 by a process time required by the color conversion circuit 205 and LOG conversion circuit 207. A pixel delay is achieved by a D-type flip-flop and a line delay is achieved by a FIFO memory.

The variable power circuit 235 actually performs an enlargement process and is controlled in quite the same manner as the variable power circuit 234 (delay times are the same).

Reference numeral 240 represents a CPU which controls a program ROM 241 and a working RAM 242 via a CPU bus 243. Each circuit described earlier is connected to the CPU bus 243 and is set with data by CPU 240 via the CPU bus 243.

<Signal Flow in Each Image Mode>

A flow of a video signal and setting an I/O port in each mode will be described with reference to FIGS. 2A and 2B.

(Normal Copy)

The flow of a video signal is 201→202→203→204→205→206 (A input→C output) →207→234→208→212→213→214→211→215→216.

The sub scan read enabled signals 221-(M to K) and 238-(M to K) are controlled to become enable in accordance with the distances between the respective color drums.

(Display of RGB Editing Process (Color Conversion) Result on CRT)

The flow of a video signal is 201→202→203→204→205→206 (A input→B output) →207→234→208 212→213→214→211→215→217→219.

In this mode, data in the image memory unit 208 is updated each time the editing contents are modified in the preview mode so that each time the data is displayed on CRT, the original is read (the flow of a video signal is repeated starting from 201). At this time, the sub scan read enable signals 221-(M to K) and 238-(M to K) rise and fall at the same time.

For printing out an image after the preview, the optical scanning is not performed and printing is simply performed by reading the data from the image memory 208. At this time, the sub scan enable signals 221-(M to K) are controlled to become enabled in accordance with the distances between the respective color drums.

(Display of CMYK Editing Process (Paint, Free Color) Result on CRT)

The flow of a video signal is 201→202→203→204→205→206 (A input→C output) →207→234→208→212→213→214→211→215→217→219.

In this mode, data in the image memory unit 208 does not change with the editing contents in the preview mode so that for displaying the data on a CRT at the second and following times, the optical scan is not performed and the data is simply displayed simply by changing the editing parameters and reading the data from the image memory 208 (the flow of a video signal starts from 208).

At this time, the sub scan read enable signals 221-(M to K) and 238-(M to K) rise and fall at the same time.

For printing out an image after the preview, the optical scanning is not performed and printing is simply performed by reading the data from the image memory 208.

At this time, the sub scan enable signals 221-(M to K) are controlled to become enabled in accordance with the distances between the respective color drums.

(Display of Synthesis Result on CRT)

(1) The flow of a video signal, when a first image is written, is 201→202→203→204→205→206 (A input→C output) →207→208.

(2) The flow of a video signal, when the first image is synthesized with a second image and the result is written in the image memory 208, is as follows.

(2-1) For memory output, the flow is 208→212→213 211→214→215→206. In this case, the data passes through the masking UCR circuit 212 without any process, and a reverse LOG table is set as gamma correction.

(2-2) For a video signal from a reflection original, the flow is 201→202→203→204→205→206.

(3) The flow of an output from the synthesis circuit is 206→207→208 (memory write), and the flow to a CRT output is 208→212→213→214→211→215→217→219.

<Settings in Editing Mode and Printing with Preview Function>

Figure 3:
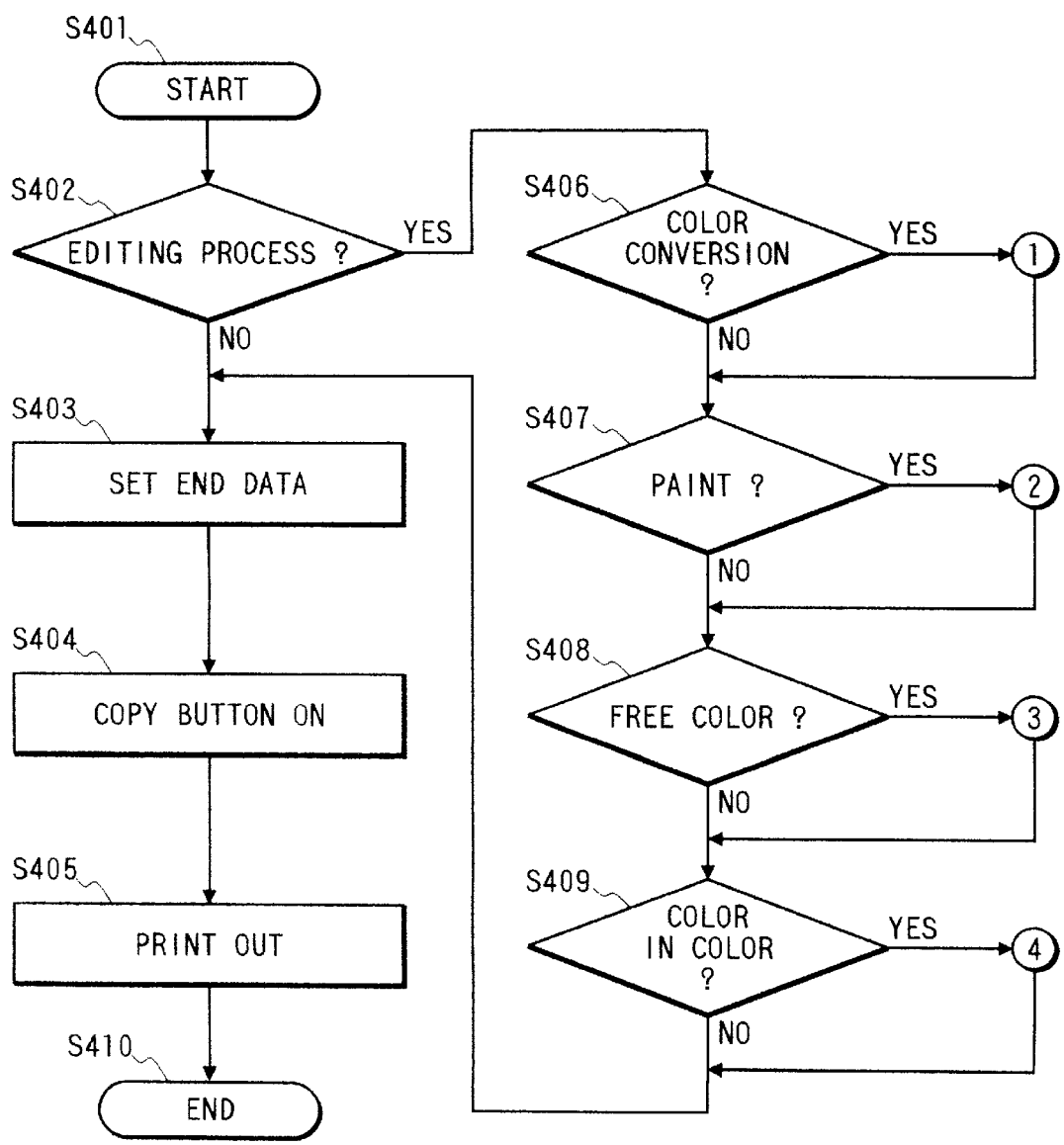
FIGS. 3 to 6 are flow charts illustrating an image forming process and a preview process.

The overall flow will be described with reference to FIG. 3.

First, an editing process is selected from the operation unit (FIG. 9) (S402), for example, at least one of a color conversion process (S406), a paint process (S407), and a free color process (S408) is selected, and final parameters are determined using the preview function and the like. The parameters are set in step S403, and the final image is printed out (S404, S405).

The procedure of each image process mode will be described.

(1) Color Conversion Process

Figure 4:
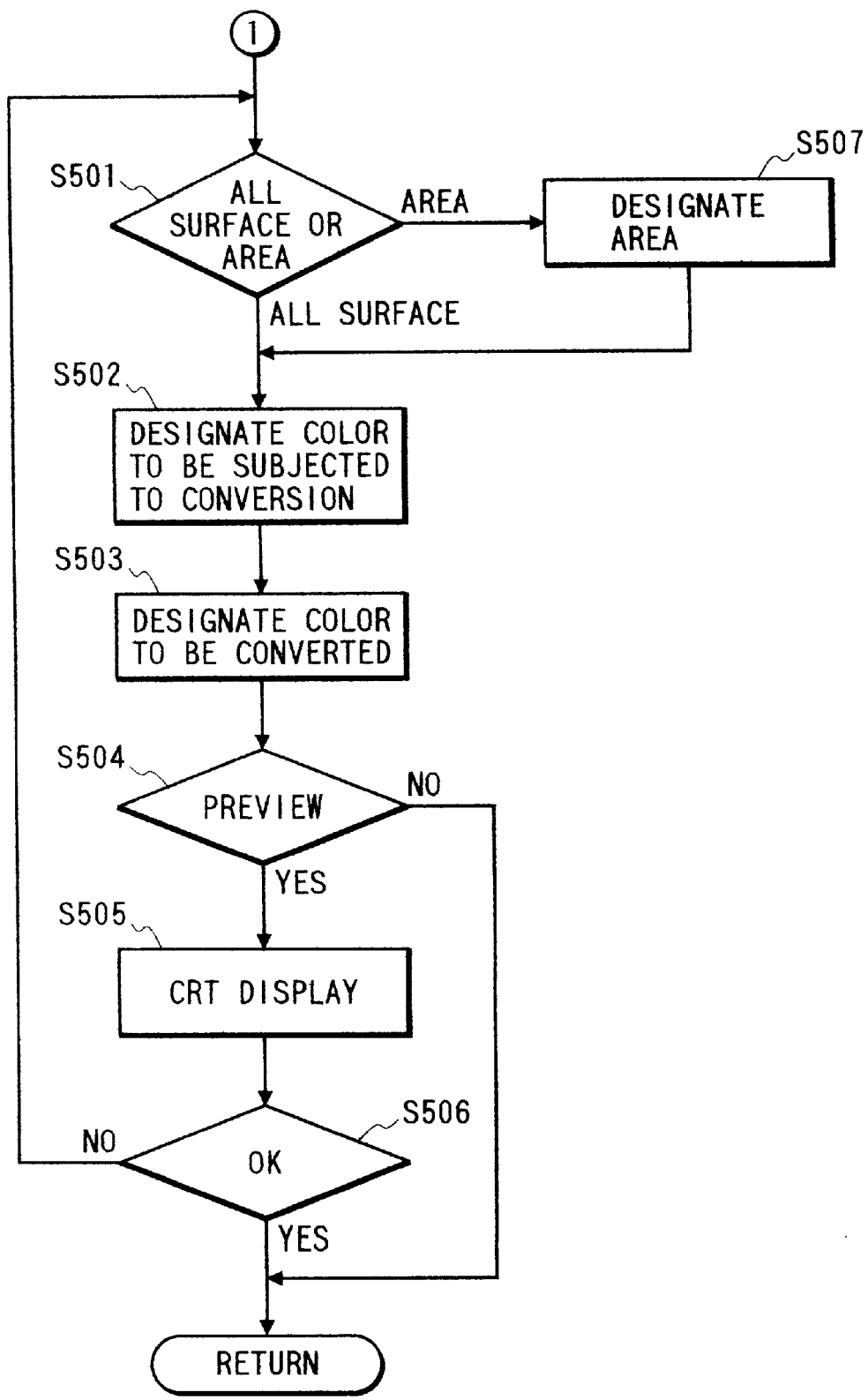

The color conversion process will be described with reference to the flow chart of FIG. 4. For the color conversion process, either a whole surface color conversion or an area color conversion is selected (S501). If the area color conversion, an area is set, for example, by using an unrepresented digitizer (S507). Next, the color before conversion is designated (S502) and a color after conversion is designated (S503) to determine data necessary for the color conversion. When a preview function is selected in step S504 (e.g., by depressing a preview button 50105 (FIG. 10)), a reflection original placed on the original support is read and the read data is processed in the order described with the above paragraph (Display of RGB Editing Process (Color Conversion) Result on CRT) to display it on CRT in step S505. If an operator is satisfied with the displayed result, another editing process is set or the displayed result is printed out, whereas if not satisfied, the setting is repeated until the operator is satisfied.

(2) Paint Process

Figure 5:
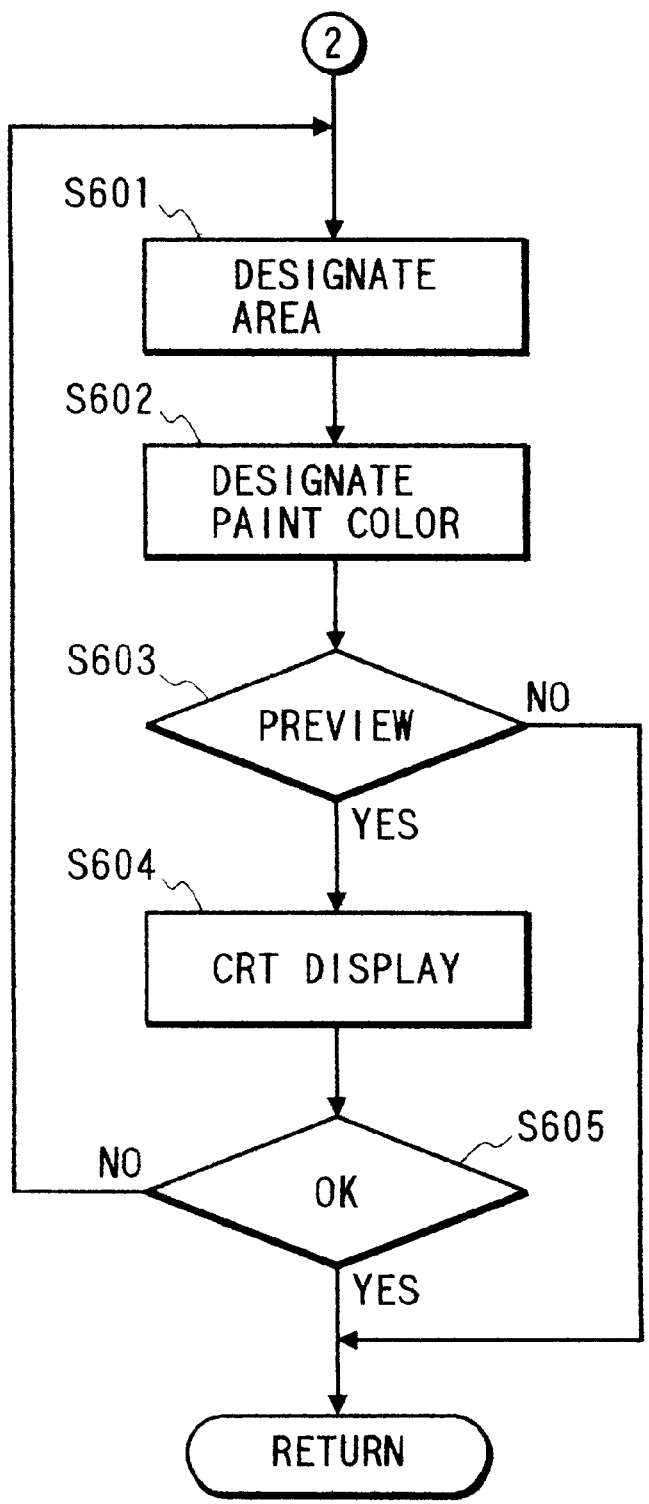

The paint process will be described with reference to the flow chart of FIG. 5. For the paint process, an area is set, for example, by using an unrepresented digitizer (S601). Next, a paint color is designated in step S602. When a preview function is selected in step S603, a reflection original placed on the original support is read and the read data is processed in the order described with the above paragraph (Display of CMYK Editing Process (Paint, Free Color) Result on CRT) to display it on CRT in step S604. If an operator is satisfied with the displayed result, another editing process is set, final parameters are set, or the displayed result is printed out, whereas if not satisfied, the setting is repeated until the operator is satisfied.

(3) Free Color Process

Figure 6:
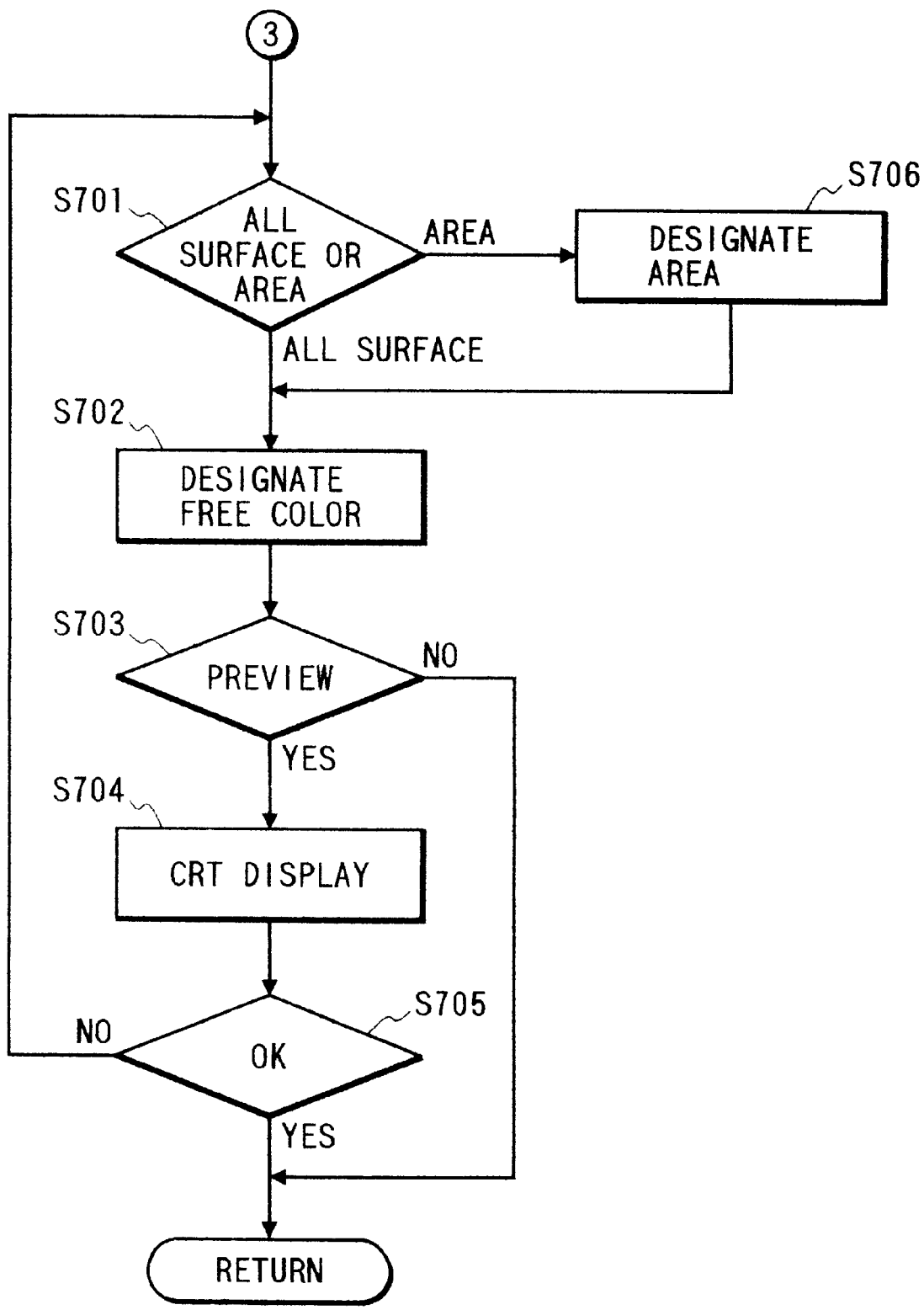

The free color process will be described with reference to the flow chart of FIG. 6. For the free color process, either a whole surface mode or an area mode is selected (S701). If the area mode, an area is set, for example, by using an unrepresented digitizer (S706). In step S706, a color for the free color process is designated. When a preview function is selected in step S704, a reflection original placed on the original support is read and the read data is processed in the order described with the above paragraph (Display of RGB Editing Process (Color Conversion) Result on CRT) to display it on CRT in step S705. If an operator is satisfied with the displayed result, another editing process is set or the displayed result is printed out, whereas if not satisfied, the setting is repeated until the operator is satisfied.

<Description of Preview Processing Unit>

Figure 7:
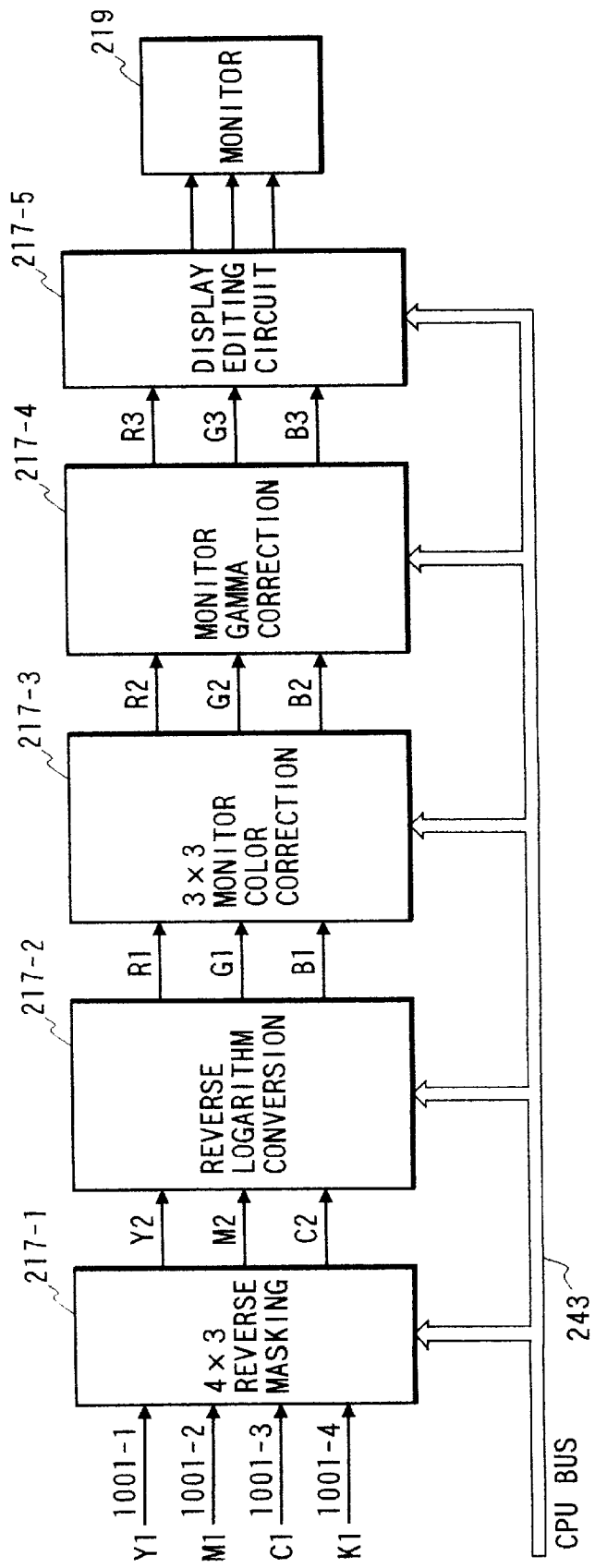
FIG. 7 is a block diagram showing the structure of a preview processing unit.

FIG. 7 is a block diagram of a preview processing circuit for processing read image data at all the processing circuits and displaying the final image on CRT 219.

Final image data Y1, M1, C1, and K1 1001-1 to 1001-4 output from the edge emphasis circuit 215 are input first to a 4×3 reverse masking correction circuit 217-1 to execute the following calculations which are reverse calculations of the masking UCR circuit 212 shown in FIG. 2B.

$$Y2=a11*Y1+a12*M1+a13*C1+a14+K1$$

$$M2=a21*Y1+a22*M1+a23*C1+a24+K1$$

$$C2=a31*Y1+a32*M1+a33*C1+a34+K1$$

Arbitrary coefficients a11 to a34 can be set by CPU 240 via the CPU bus 243. The four-color information is converted into three-color information Y2, M2, and C2 which is input to a reverse logarithm conversion correction circuit 217-2. This correction circuit 217-2 is constituted by a LUT used for performing reverse calculations of the LOG circuit 207 shown in FIG. 2A. Similar to the above, arbitrary correction data can be set by the CPU. With these calculations, the YMCK density data is converted into luminance data for allowing to display it on the CRT. There are many types of CRTs having various color reproduction characteristics. Therefore, means for matching the characteristics of the CRT is necessary. A 3×3 monitor color correction circuit 217-3 corrects the luminance data to match the monitor color characteristics and executes the following calculations.

$$R2=b11*R1+b12*G1+b13*B1$$

$$G2=b21*R1+b22*G1+b23*B1$$

$$B2=b31*R1+b32*G1+b33*B1$$

Arbitrary coefficients can be set by CPU 240 like the reverse masking circuit 217-1.

A monitor gamma correction circuit 217-4 corrects the luminance data to match the gamma characteristics of a monitor, and arbitrary correction data can be set by CPU 240.

A display editing circuit 217-5 performs various editing processes for the image data displayed on the monitor and controls the monitor.

Figure 8:
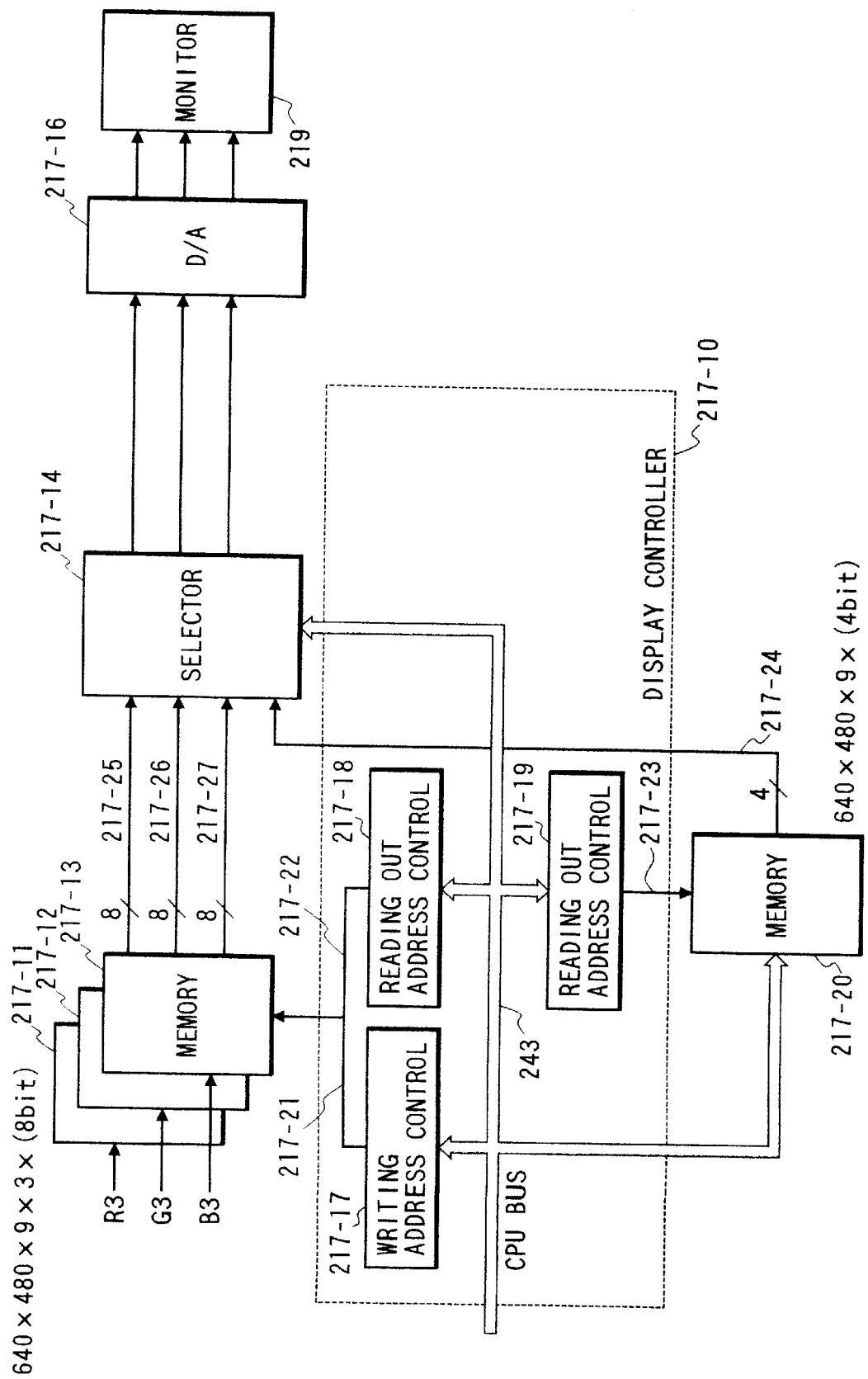
FIG. 8 is a block diagram showing the structure of a display editing circuit.

FIG. 8 shows the details of the display editing circuit which is roughly divided into a read image processing section and an additional information adding section for adding a frame, character, or the like to the image.

R3, G3, and B3 data after the monitor gamma correction by the monitor gamma correction circuit 217-4 are supplied to memories 217-11, 217-12, and 217-13. Start and end addresses in X and Y directions can be set via the CPU bus 243 to a writing address control circuit 217-17 of a display controller 217-10 which supplies an address signal 217-21 so that data can be written starting from a desired location of each memory. In this embodiment, the memory size of each color is 640×480×9×(8 bits).

The original image size can be reduced when the image data is stored in the memory, the magnification factor being set by CPU 240. In accordance with whether the image is horizontally or vertically long, the writing address control circuit 217-17 can operate to rotate the image as desired. In this case, the area outside of the start and end addresses, i.e., the area where an image is not written, has the previous image or the fixed display color. Therefore, in this embodiment, CPU 240 can control to display the area other than the writing area with a desired color.

The CPU can set arbitrary coordinate values to a reading address control circuit 217-18 to read the image data in the memory at desired locations and display it on the monitor. This designation can be performed in real time, by using a touch panel key of the operation unit to be described later. Since the image size of the monitor of this embodiment is 640×480 dots, it is necessary to thin the image in order to display the entire image stored in the memory. A thinning factor can be set by the CPU. In this embodiment, as will be later described, an operator can select one of a full mode of displaying the whole image stored in the memory, a twofold mode of displaying ½ the image stored in the memory, and a threefold mode of displaying ⅓ the image stored in the memory.

A memory 217-20 is used for adding information such as figures and characters to the image and has a size of 640×480×9×(4 bits) which allows to independently develop figures and characters of four frames.

In this embodiment, although the data is developed directly on the memory by CPU 240, it may be developed by a dedicated controller capable of developing data at high speed, such as AGDC (manufactured by NEC CORP.). The reading address control circuit 217-19 can set a reading start location and a thinning factor, similar to the reading address control circuit 217-18.

The data read from the memories is input to a selector 217-14. If a signal 217-24 read from the memory 217-20 is "L", the selector outputs the image data itself 217-25 to 217-27, and if the signal is "H", it outputs R, G, and B (8 bits) data of four frames. These R, G, and B data can be set by CPU 240 and a desired color is given to the figures and characters in each of the four fields.

The signal output from the selector 217-14 is converted into an analog signal by a D/A converter 217-16 to display a final image on a monitor 219.

<Structure of Printer>

Referring back to FIG. 1, the outline of the printer unit of this invention will be described.

The printer unit is an image forming apparatus capable of forming a full-color image by using toners of four colors including magenta, cyan, yellow, and black, the image forming apparatus having four image forming stations independently provided for magenta, cyan, yellow, and black. At the respective stations, photosensitive drums as image bearing members 101*a* to 101*d* are mounted. The surface of each photosensitive drum is uniformly charged by primary high voltage charger and grid high voltage units 103*a* to 103*d*. After uniform charge, in accordance with image information of each color scanned by a laser optical system 107, an image of each color is exposed on each photosensitive drum by each laser scan system 102*a* to 102*d* to form an electrostatic latent image. The latent image of each color is developed by each developer 104*a* to 104*d* having each color toner of magenta, cyan, yellow, and black. The toner image is transferred to a recording sheet transported by a transfer belt 108, by each transfer charger 105*a* to 105*d*. The residual toner on each photosensitive drum is removed by each cleaner 106*a* to 106*d*.

<Two-side Image Forming Sequence>

The two-side image forming sequence will be described assuming that a recording sheet is fed from an upper cassette.

Recording sheets P stacked on a paper feeder cassette 110a start being fed at the same time when an image forming start signal is turned on and an unrepresented first paper feeder roller solenoid is activated. A recording sheet P fed from the cassette is transported by transport resist rollers 113 and 114 and forms a predetermined loop to temporarily stop, while the front end of the recording sheet P abuts on a first resist roller 115.

On the other hand, at the same time when the image forming start signal turns on, an original on the platen is read with a CCD 201 and the read image signal is supplied to an image processing unit 14. After the image data stored in the image memory of the image processing unit 14 becomes ready for being laser scanned, the first resist roller 115 starts being driven. With this first resist roller 115 being driven, the recording sheet P is attached to the transfer belt at a predetermined area and transported for the image formation. Each color image is transferred to the recording sheet P. In this case, the image data of the original stored in the memory is written on each photosensitive drum by the laser optical system 107 at the timing when the recording sheet P passes through each station of magenta, cyan, yellow, and black to thereby transfer each color image on the recording sheet in a superposed manner. The toner images transferred in a superposed manner to the recording sheet P while passing through the respective stages are thereafter fixed by a fixing unit 109.

In the copy operation of the first side, at the same time when the image forming start signal turns on, an unrepresented paper re-feeder roller releasing solenoid is activated so that a paper re-feeder roller 112 rises for the preparation of two-side image forming. Also in this case, an unrepresented paper transport path deflecting solenoid is activated to drive a first paper deflecting plate 114 and form a paper transport path for the two-side image forming. At the same time, in accordance with the paper size, a paper stopper solenoid SL (not shown) in an intermediate tray 111 is activated to drive a paper stopper plate (not shown) in the intermediate tray.

At the same time, a second transport unit driving solenoid SL (not shown) is activated to drive the second transport unit, i.e., a roller pair 115.

After the fixing operation of the first side, the recording sheet P is transported to a second side path by the first paper deflection plate 114 and transported to the transport roller 115. When the recording sheet P passes by a paper reversal detecting sensor 119 mounted on a switch-back unit (paper reversal unit) 117, a reversal driving solenoid SL5 (not shown) is activated so that the normal/reverse roller 116 rotates in the reverse direction. Therefore, the recording sheet P is switched back and transported to the second transport unit (transport roller 120). Reference numerals 121 and 122 represent a paper size type deflection plate which changes the transport path of the recording sheet P transported into the intermediate tray 111 by activating each paper deflection solenoid SL7, SL8 (not shown) in accordance with the paper size.

When the first recording sheet P is transported into the intermediate tray, the paper re-feeder roller releasing solenoid (not shown) is temporarily turned off to move the rotating paper re-feeder roller 113 downward onto the recording sheet P. Therefore, the transported recording sheet P abuts on a paper stopper plate (not shown) to ensure a tray paper sensor (not shown) to reliably detect the recording sheet P.

With the series of operations described above, the recording sheets recorded with the image on the first side are sequentially stacked in the intermediate tray 111 and stand by for the second side image forming.

In this stand-by state, the second paper feeder roller 112 is on the recording sheets P stacked in the tray. In this state, when a second side image forming signal is turned on, the second side image forming operation starts. Specifically, the second transport unit driving solenoid (not shown) is activated so that the paper re-feeder roller 112 rotates and re-feeds the uppermost recording sheet P in the tray. When the first recording sheet starts being fed, i.e., when the transport roller 122 starts feeding the first recording sheet, the second paper feeder roller rises. After the completion of feeding the first recording sheet, the rotating second paper feeder roller is moved downward at a predetermined timing to feed the next recording sheet (second sheet). The paper re-feeder roller 112 repeats this up/down motion. The re-fed recording sheet is transported by the transport roller 114 and abuts on the first resist roller pair at its front end to form a predetermined loop and temporarily stop. Thereafter, similar to the first side image forming, the recording sheet is fixed to the transport means 108 and transported at a predetermined timing, and passes through the first to fourth stations. After the second side image is formed, the fixing operation of the second side image is terminated. Since the first paper deflection plate solenoid (not shown) is turned off when the second side image forming starts, the recording sheet formed with the second side image and fixed is guided to a discharge roller and discharged to a discharge tray. After the last recording sheet is discharged, the series of operations described above are terminated.

<Operation Unit>

Figure 9:
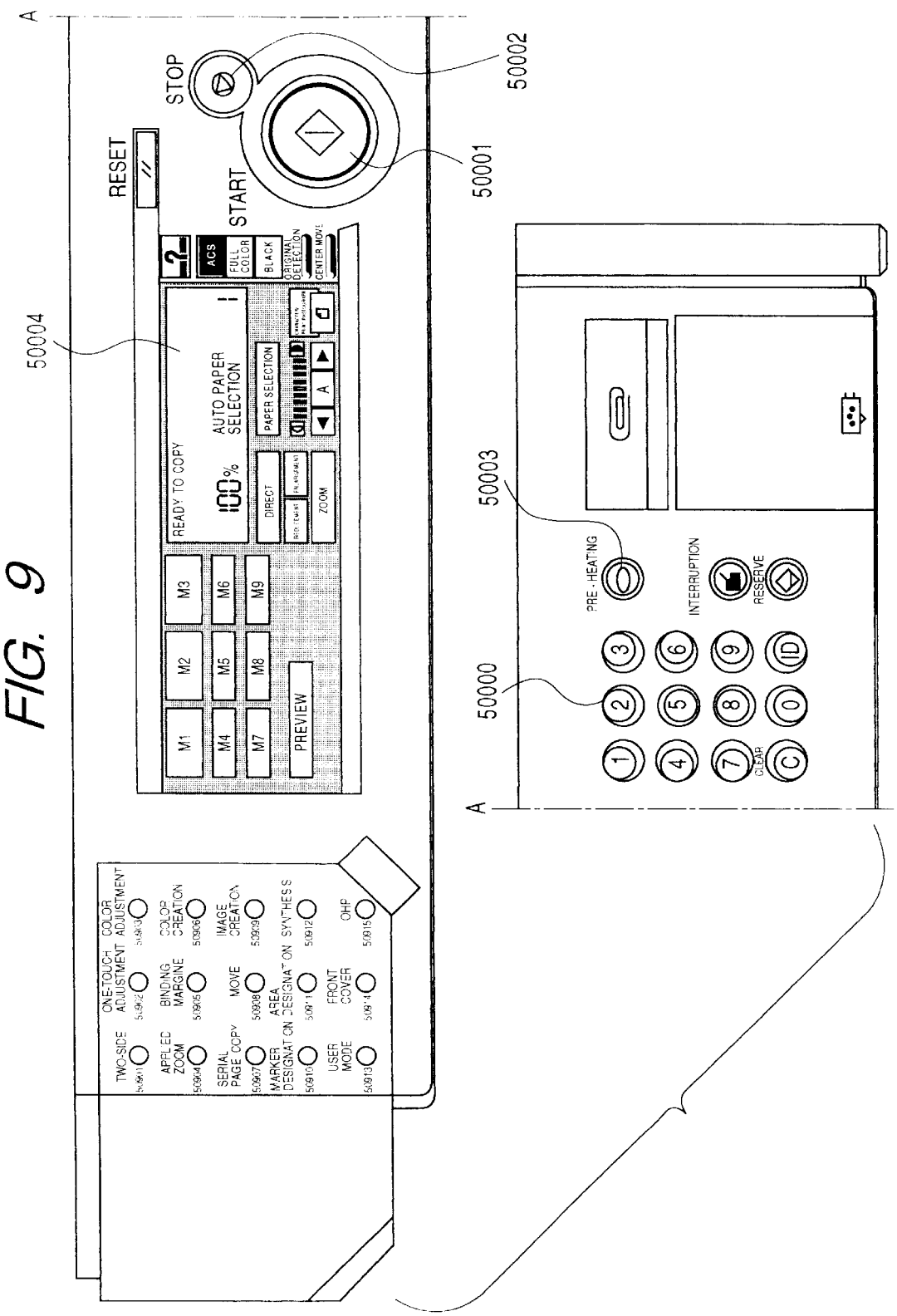
FIG. 9 shows an operation unit.

FIG. 9 shows an outer appearance of the operation unit. Reference numeral 50000 represents numerical keys, reference numeral 50001 represents a copy start key, reference numeral 50002 represents a stop key, reference numeral 50003 represents a remaining heat key, and reference numeral 50004 represents a display unit constituted by a liquid crystal display and a touch panel.

Figure 10:
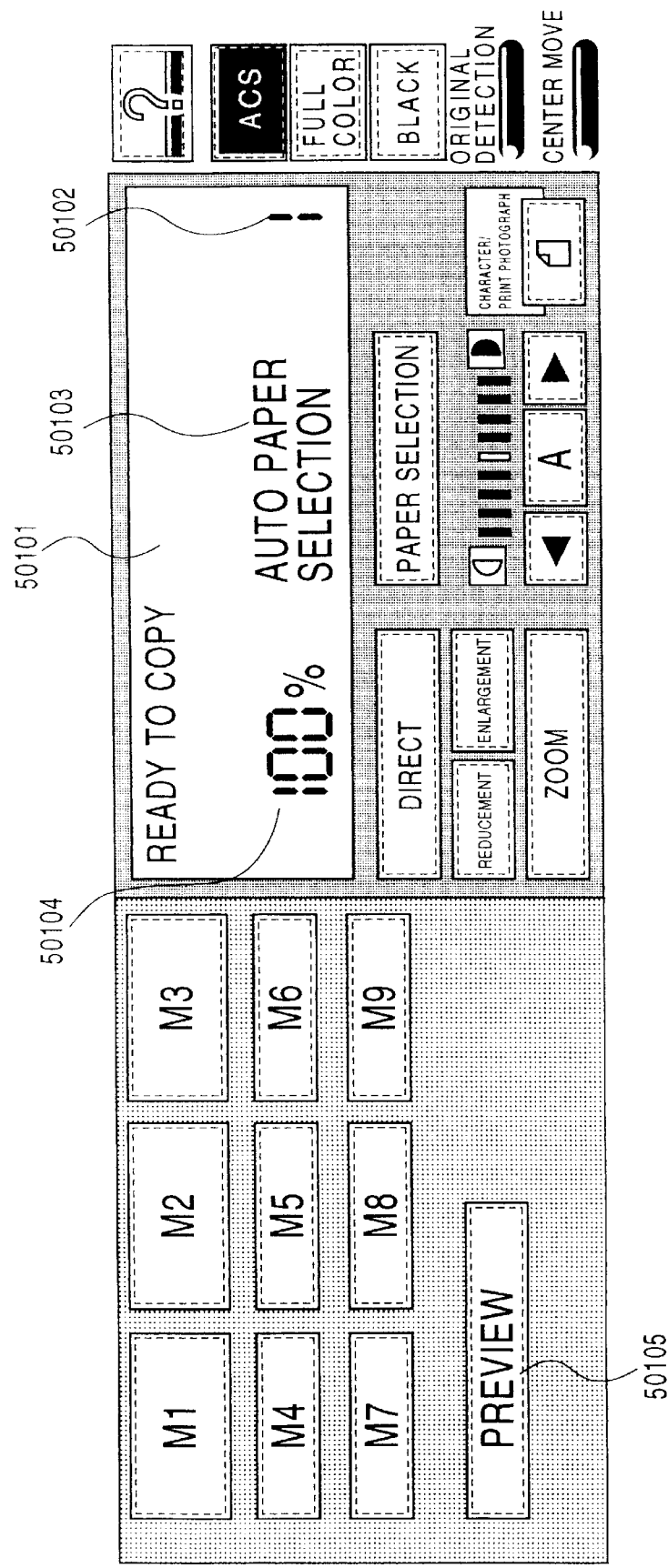
FIGS. 10 to 14 show display screens of the operation unit illustrating various setting states.

A standard screen on the display unit 50004 is shown in FIG. 10.

In the standard screen shown in FIG. 10, reference numeral 50101 represents a display of whether or not a copy is ready. Reference numeral 50102 represents a display of the set number of copies, reference numeral 50103 represents a display of a selected paper size, and reference numeral 50104 represents a display of a copy magnification. Reference numeral 50105 represents a touch key for designating a preview mode.

Prior to starting the preview mode, an operator designates from the operation unit, an image magnification, a paper size, and an editing process, and depresses a preview mode key. The screen on the display unit changes from the standard screen to a preview operation screen.

Figure 11:
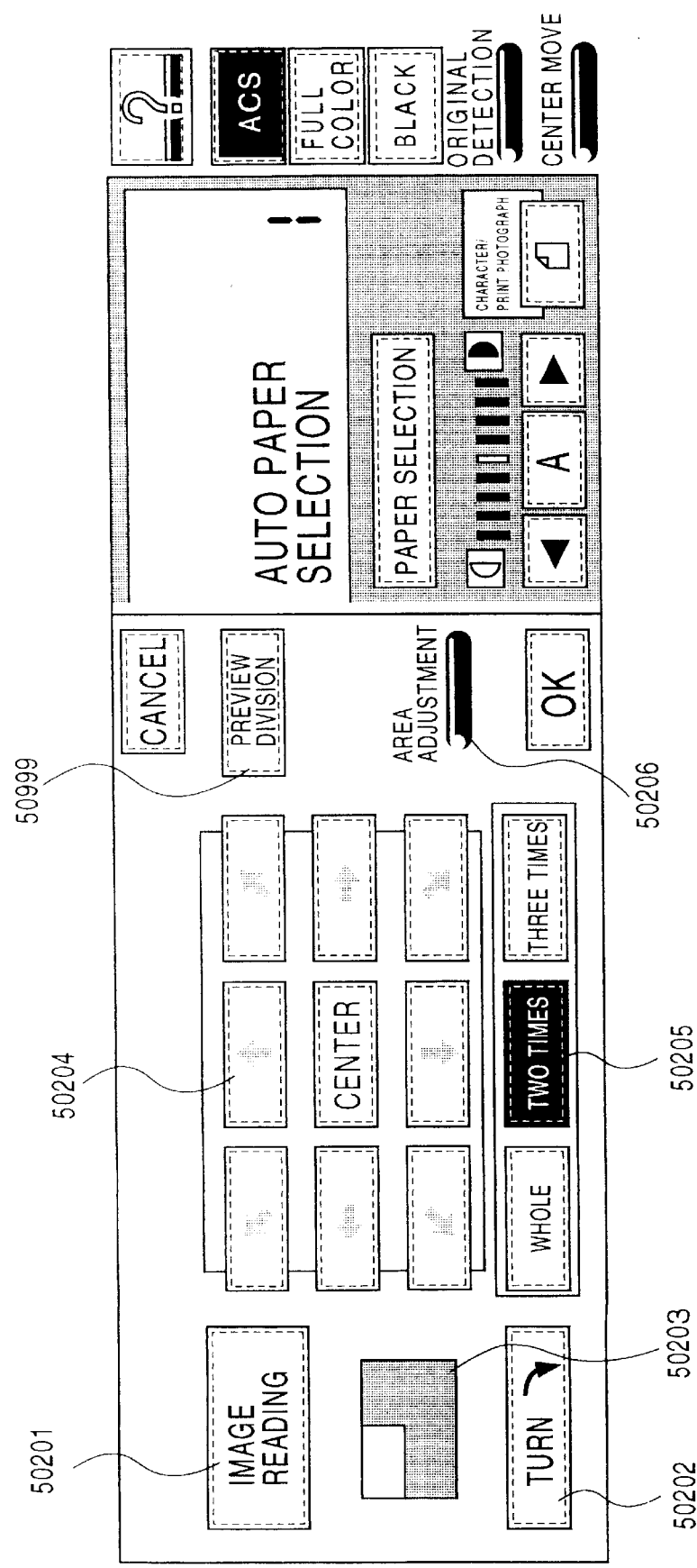

FIG. 11 shows an example of the preview operation screen. Reference numeral 50201 represents a preview start key (image read key) for previewing an original, reference numeral 50202 represents display direction setting keys for setting the direction of an image on CRT 219, reference numeral 50203 represents an area monitor for displaying the area of the displayed image, reference numeral 50204 represents display position setting keys for setting the area of the image to be displayed, reference numeral 50205 represents display magnification setting keys, and reference numeral 50206 represents an area adjusting key.

An operator first sets an original on an original support or feeder 11 and the display direction (vertical or horizontal) of the original is set with the display direction setting key 50202. With the ordinary display direction, the original image starting from the original abutting position of the original support is displayed at the upper right of CRT 219. As the display direction setting key 50202 is depressed, the display of the display direction setting key is changed between white and black, and the image rotated by 90 degrees is written in the display memories 217-11 to 217-13. Therefore, the original image rotated by 90 degrees relative to the original abutting position of the original support is displayed on CRT 219.

When the operator depresses the preview start key 50201, the original is transported from the feeder to the original support if the original is set to the feeder, and a pre-scan is performed to detect the original size and position on the original support if the original detecting mode is set. Thereafter, a scan operation starts reading the original. The read image is subjected to various editing processes and supplied to the preview processing unit 217 whereat it is converted into RGB signals and written in the image memories 217-11 to 217-13 by calculating the most efficient size allowing the entire image to be stored therein, in accordance with the set display direction, display magnification, original size, and the like. The data in the image memories 217-11 to 217-13 is corrected by LUT 217-4 in accordance with the CRT characteristics and transferred to the display controller 217-10 to display a preview image on the CRT.

The capacity of each image memory 217-11 to 217-13 is 1920×1440 pixels which is nine times as large as the size of 640×480 pixels of CRT. Therefore, when the data is transferred from the image memories to the CRT, it is necessary for the display controller 217-10 to change the size of the data in the image memories 217-11 to 217-13 in accordance with the display size of the CRT and the display magnification set with the display magnification setting key 50205.

Figure 15:
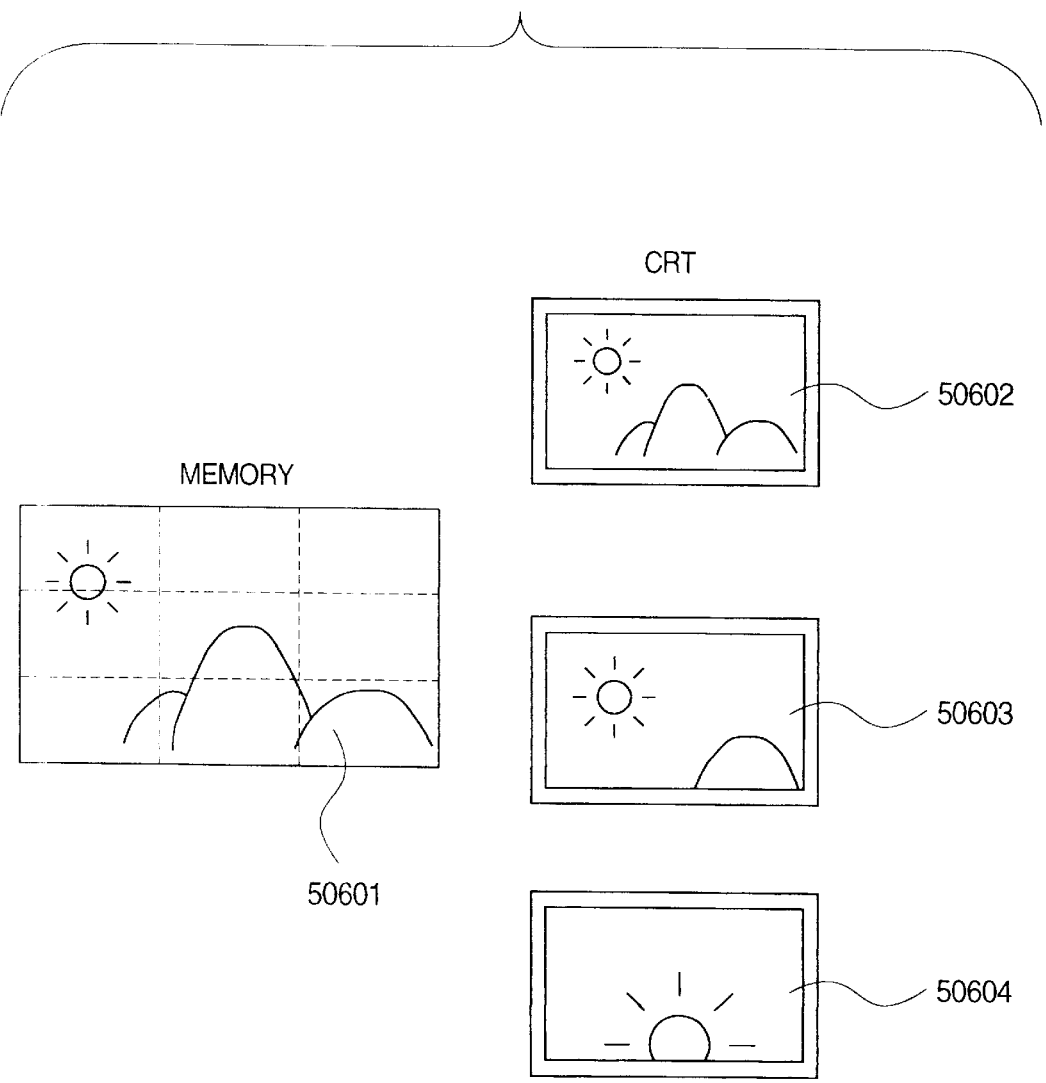
FIG. 15 is a diagram illustrating a display magnification for a preview.

Specific examples are shown in FIG. 15. Data indicated at 50601 is being stored in the image memories 217-11 to 217-13. If the "whole" key among the display magnification keys is set, the entire data area in the image memories 217-11 to 217-13 is reduced by ⅓ by the display controller 217-10 and displayed on CRT as indicated at 50602. If the "two times (twofold)" key is depressed, the data in a ⅘ area of the whole area in the image memories 217-11 to 217-13 is reduced by ¼ by the display controller 217-10 and displayed on CRT as indicated at 50603. Namely, the data in a partial area in the image memories 217-11 to 217-13 is enlarged by two times as compared to the display of the entire area. Similarly, if the "three times (threefold)" key is depressed, the data in a ⅓ area of the entire area in the image memories 217-11 to 217-13 is directly transferred to display it on CRT as indicated at 50604, this image in the ⅓ area being enlarged by three times as compared to the display of the entire area.

If the twofold or threefold is set with the display magnification setting key, part of the data in the image memories 217-11 to 217-13 is displayed on CRT. In this case, if the reading address is changed and the data is transferred to CRT, the area not displayed before can be displayed. Specifically, in the case of the twofold set with the display magnification setting key, an arbitrary image corresponding to the ¼ area in the image memories is displayed on CRT. In this case, each time the downward arrow key among the display position setting keys 50304 is depressed, the reading start position of the image memories move downward by four dots and the image in the ¼ area from the reading start position is transferred to the CRT. Therefore, the image at the lower area of the screen not displayed before it can be displayed. If the image read from the memories contains one side edge of the whole image and the reading start position is moved to this side edge at the next time, the image is outside of the image memories. Therefore, in order to notify the operator of that the image cannot be moved to this side, the display position setting key toward this side is displayed with cross hatching. In order to notify the operator of the partial area displayed on CRT, this area is displayed on the area monitor 50302.

<Area Correction in Preview>

If the operator sets the area designation mode, a preview image with the area designated is displayed. If the position and size of the designated area are different from those intended by the operator, or if the processed color of the image in the designated area is something different from that intended by the operator, the position and size of the designated area or the processed color can be finely adjusted and corrected on the preview screen.

Figure 16:
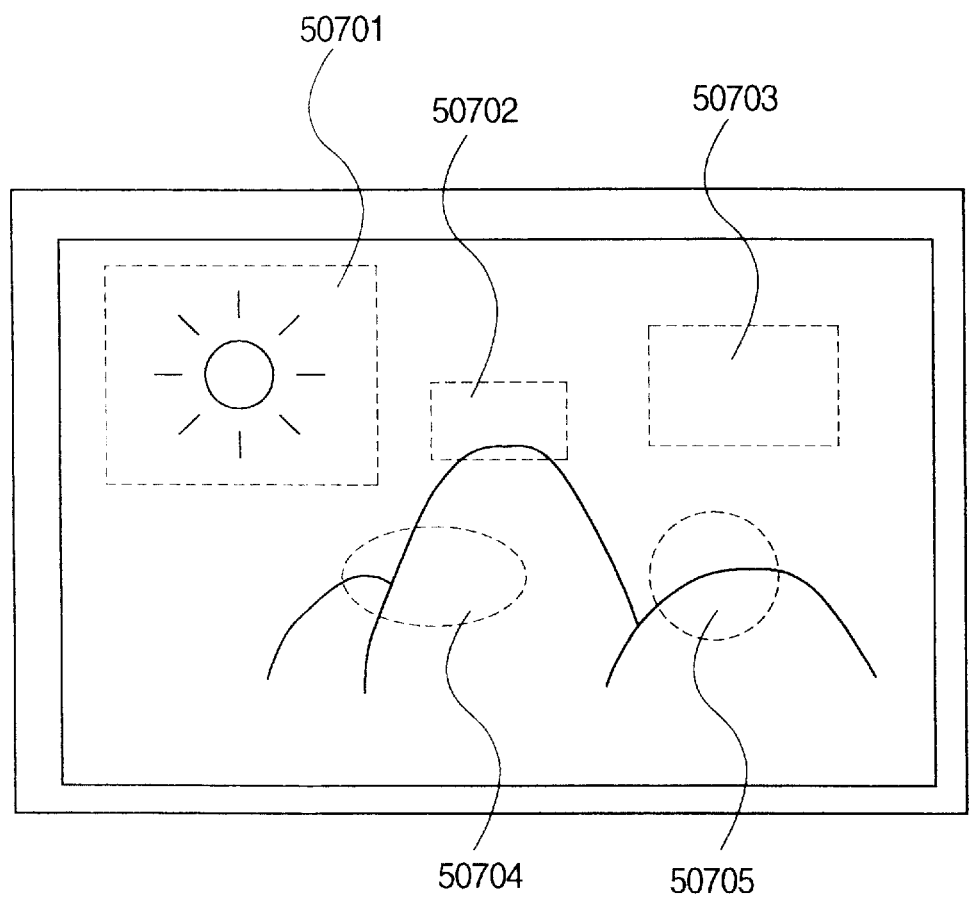
FIG. 16 is a diagram illustrating a designation for a preview.

As the operator depresses the area adjustment key 50206 (FIG. 11) after the preview, the display unit selects the area selecting screen. When the area selecting screen is selected, as shown in FIG. 16 the size and position of the outer frame of the entire area are calculated from the copy magnification, display magnification, display direction, and the like. The area generating unit 220 generates an image of the outer frame which is developed on an area screen memory 1 (hereinafter called a plane memory 1) and transferred to an area display memory 1 (hereinafter called a plane memory 1') to display it on CRT. This area outer frame is displayed on the currently displayed preview image. The area outer frame is displayed in the color set to the plane memory 1. The plane memories are formed in a divided field of the memory 217-20.

The plane memory 1 has a capacity several times larger than the display size of CRT. In accordance with a magnification set with the image magnification setting key and the display position set with the display area setting key, the transfer area and magnification of the plane memory 1 are calculated and transferred to the plane memory 1'. Therefore, each time the image display magnification setting and display area setting are changed, the area outer frame is displayed in correspondence with the changed preview screen.

In this area process, the process contents of thirty types at a maximum can be set. Fifteen areas at a maximum can be set per each process. For example, in FIG. 16 showing an example of the preview image with a plurality of designated areas, the first area process performs a paint process for three areas including a first area 50701, a second area 50702, and a third area 50703, and the second area process performs a color conversion process for two areas including a fourth area 50704, and a fifth area 50705.

In the case where a plurality of areas are designated, an operator is required to identify each area by an area process number setting key and an area number setting key.

Figure 12:
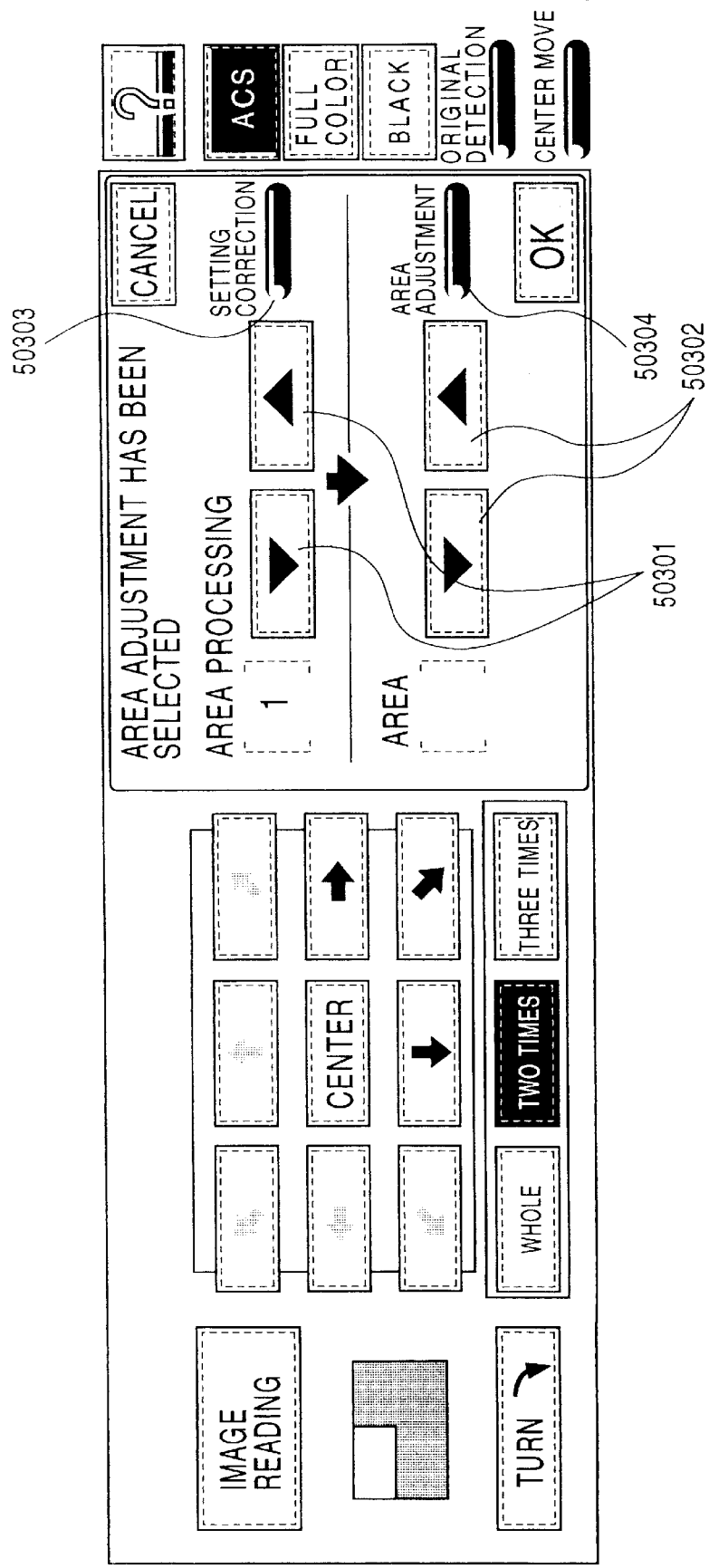

As the area adjustment key 50206 shown in FIG. 11 is depressed, the screen shown in FIG. 12 is displayed. A desired area process number is selected by depressing an up-key and a down-key of the area process number setting keys 50301. Assuming that the first area process is selected, the outer frames (50701, 50702, 50703) of the areas of the first area process are calculated in the manner described above, and the area generating unit 220 forms the outer frame image on an area image memory 2 (hereinafter called a plane memory 2). This outer frame image is enlarged or reduced by the magnification designated by the display magnification setting key and transferred to an area display memory 2 (hereinafter called a plane memory 2') to display it on CRT in a color different from that set to the plane memory 1'. Since the display colors set to the plane memories 1' and 2' are different, the area process designated from a plurality of area processes can be identified based upon a different color display on CRT. As the area process number 2 is designated by depressing the up-key of the area process number setting key 50301, the outer frame image of the first area process written in the plane memory 2 is deleted, and the outer frame image of the second area process is written and displayed on the CRT.

Figure 13:
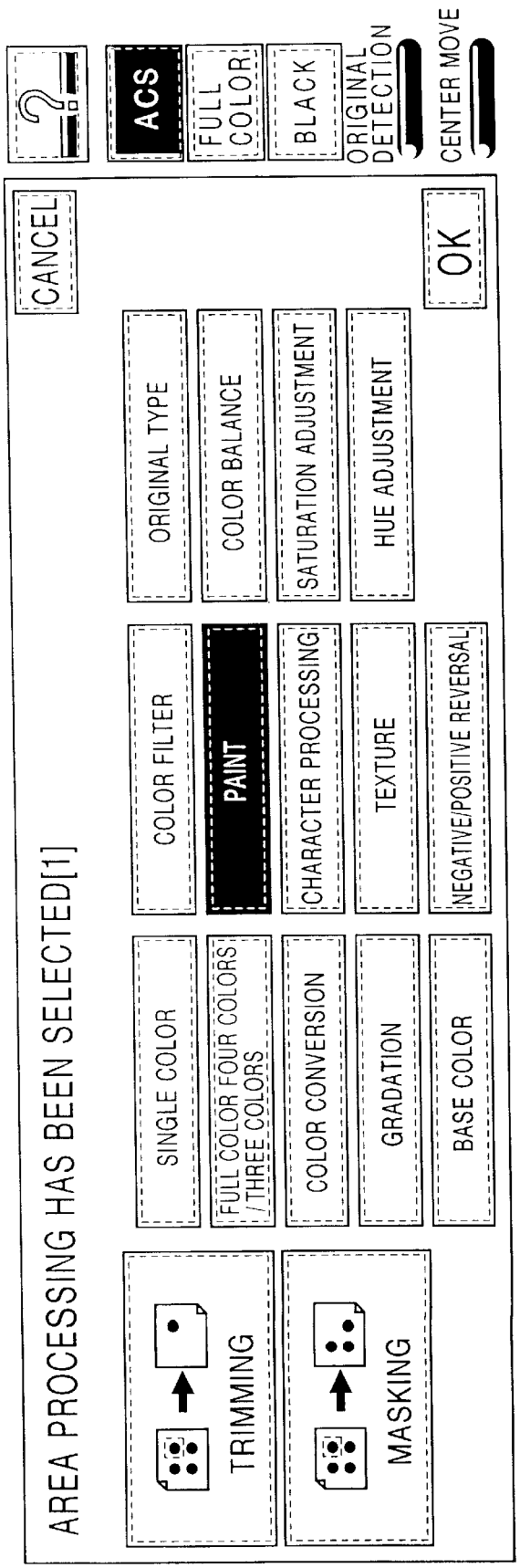

As the operator depresses a setting correction key 50303 after the area process whose process contents are to be changed, is identified in the above manner, the screen shown in FIG. 13 is displayed. The process contents can be changed by selecting a desired process on this screen.

If the size of an area is to be changed, the number of the area process containing an area to be changed is selected with the area process number setting key 50301 and the area to be changed is selected with the area number selecting key 50302, in the manner described above. For example, if the fifth area 50705 of the second area process is to be moved left by 1 cm, the second area process is selected by the area process number setting key. Next, as the area number setting key is depressed, the fourth area 50704 of the second area process is selected. At this time, the area generating unit 220 develops the outer frame image of the fourth area on the area image memory (hereinafter called a plane memory 3). The outer frame image developed on the plane memory 3 is transferred to an area display memory 3 (hereinafter called a plane memory 3') to display it on the CRT. The color displayed on the CRT is different from the colors set to the plane memories 1' and 2'. The priority order of each area display memory is plane memory 1'<plane memory 2'<plane memory 3'. Therefore, even if the operator does not memorize the number of the area process to be changed, the area process designated among all the area processes can be identified and the area to be changed can be identified.

If the fifth area 50705 is selected by the area number setting key, the outer frame image of the fourth area 50704 on the plane memory 3' is deleted and the outer frame image of the fifth area is written therein to display it on the CRT.

Figure 14:
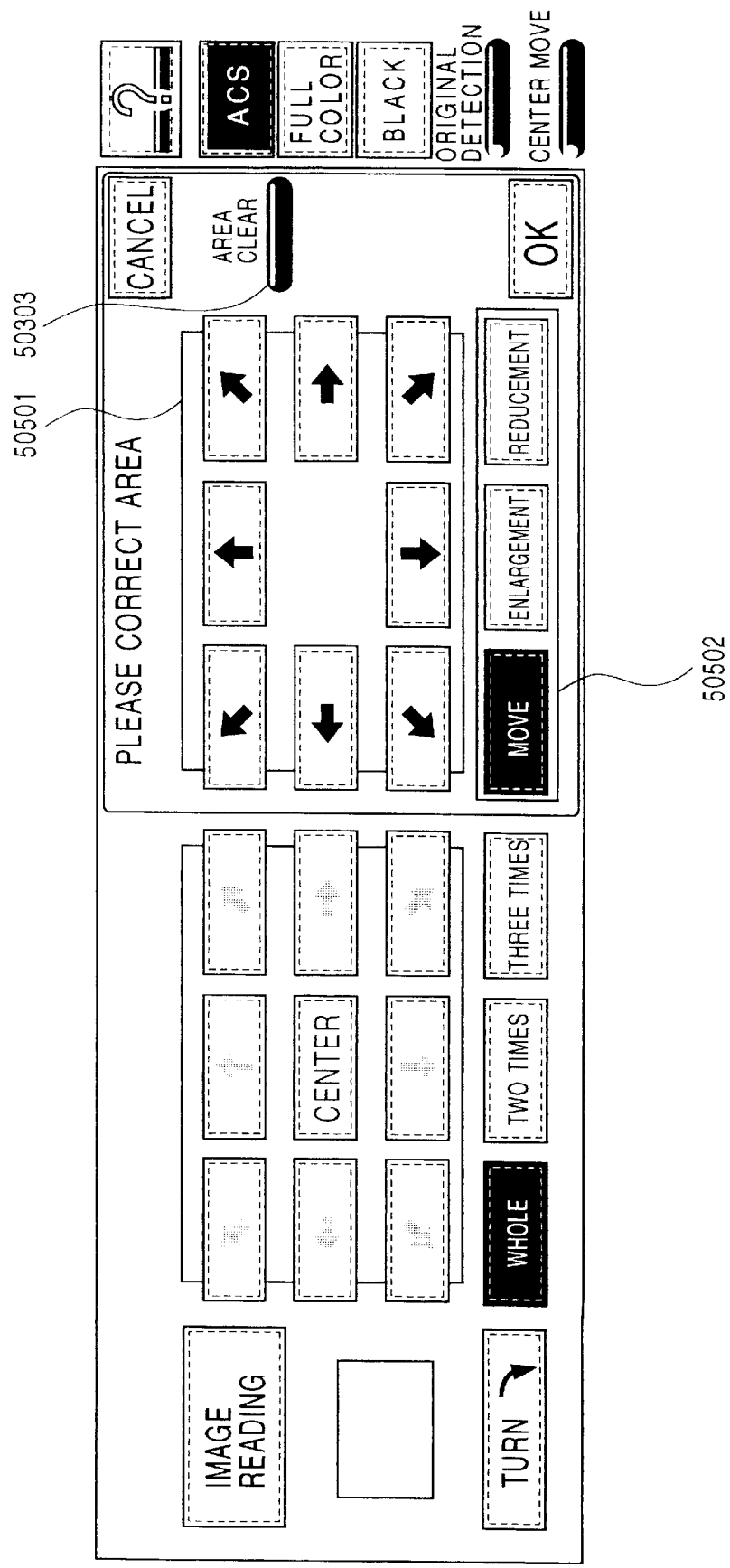

As the operator depresses the area correction key after the area whose size is to be changed, is designated, the screen shown in FIG. 14 is displayed.

FIG. 14 shows the area size correction screen. Reference numeral 50501 represents area correction keys for designating the direction of moving an area, reference numeral 50502 represents area correction setting keys for setting the type of area correction, and reference numeral 50503 represents an area clear key.

For example, if the fifth area is to be moved left, the operator first designates a move key among the area correction setting keys 50502. Then, the left arrow key among the area correction keys 50501 is depressed. At this time, the outer frame image of the fifth area stored in the plane memory 3 is cleared and the outer frame image moved left by four pixels is formed on the plane memory 3 and transferred to the plane memory 3' to display it on CRT. In this manner, the designated area moves on the preview display screen. The motion amount is fed back to the CPU so that when the image read key is depressed again to perform the preview, the image is processed in accordance with the changed area position. In this manner, the area can be moved while viewing the designated area on the preview display screen. Similar to the above, if the area size is to be changed, the operator selects an enlargement key or reduction key among the area correction setting keys 50502 and depresses the arrow key among the area correction keys 50501, and so the area is enlarged or reduced in the direction of the depressed key.

After the size, position, or contents of an area is corrected while viewing the preview display screen and an image desired by the operator can be displayed on the CRT, the start key 50001 is depressed to print out the image.

<Serial Page Copy Mechanism in Book Mode>

Next, the serial page copy mechanism in the book mode will be described.

With the serial page copy mechanism, an original of two pages placed on the original support is read one page after another and processed in a unit of two pages (In this case, the original is an A4 size book opened and placed on the original support). The output order depends on whether the placed book is of left-side paging (horizontal writing system) or right-side paging (vertical writing system). Specifically, in the case of left-side paging, the original reading order is from left to right on the original support and copied pages are discharged on the discharge tray with face-up and in the descending order. In the case of right-side paging, the original reading order is from right to left on the original support and copied pages are discharged on the discharge tray with face-up and in the descending order.

Therefore, before a book original is serially copied, an operator is required to designate from the operation unit whether the book original is of left- or right-side opening. Specifically, if the operator designates in advance whether the book original is of left- or right-side opening, the book original is serially copied from the last page to the start page, and all copied pages are stacked on the discharge tray in the descending order.

Figure 17:
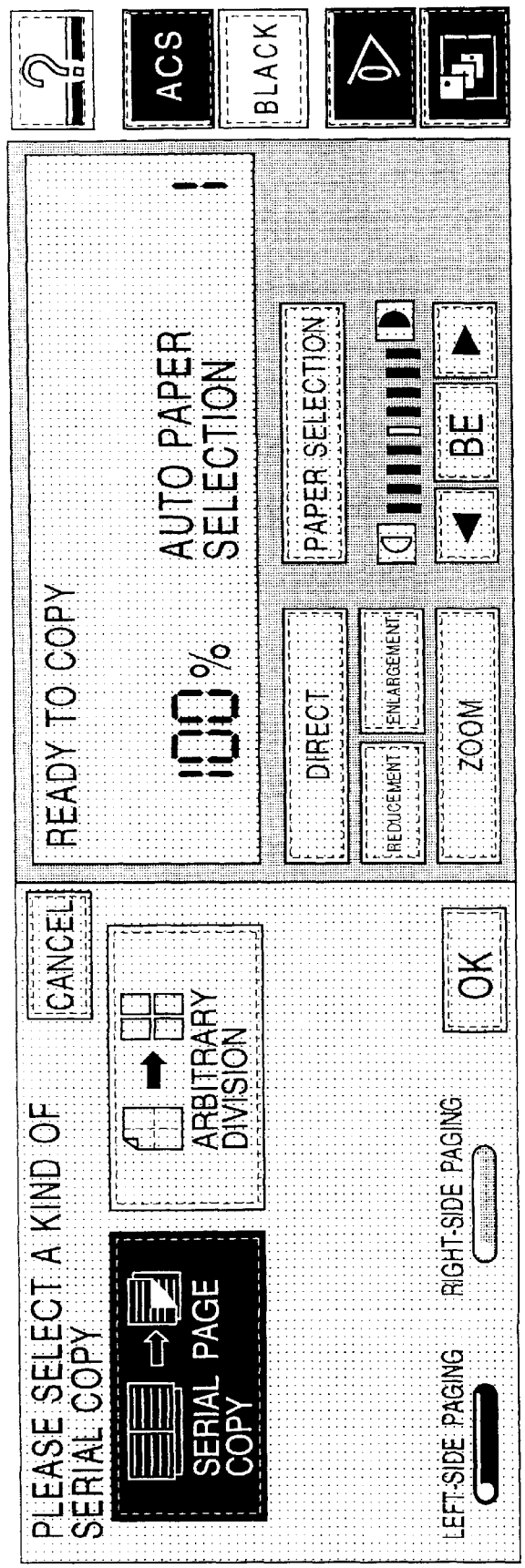
FIGS. 17 to 34 show display screens of the operation unit illustrating various setting states.
Figure 20:
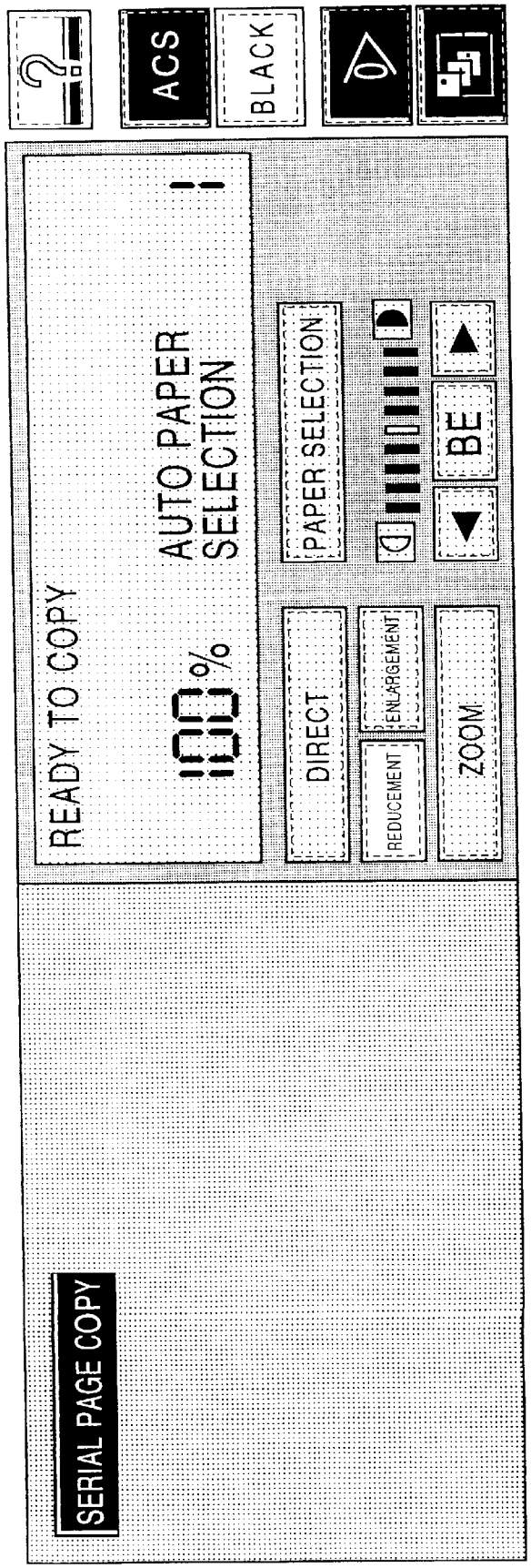

As the operator depresses a serial page copy key 50907, the operation unit displays the serial page copy setting screen shown in FIG. 17. The operator then selects a serial page copy key and one of left- and right-side paging keys, and thereafter depresses an OK key to establish the serial page copy function. At this time the screen shown in FIG. 20 is displayed. When the operator depresses the copy start key 50001 in this state, a copy operation starts in the serial page copy mode such as described above. In this case, synchronously with the copy operation, an output image is displayed on the display (CRT) 21 in the same order of actually copying pages.

If the operator wants to display the preview image on the display (CRT) 21 prior to the actual copy operation, the preview mode key 50105 is depressed to display the preview operation screen, without depressing the copy start key 50001 after the serial page copy function is established. In this state, the preview start key 50201 is depressed to display the preview image on the display (CRT) 21.

The preview image on the display (CRT) 21 is displayed in the page order from left to right if the left-side paging is selected, and from right to left if the right-side paging is selected, i.e., in the same order of actually copying pages.

A preview division key 50999 is provided on the preview operation screen (FIG. 11). If this key and the preview start key 50201 are depressed, both right and left pages of the original book on the original support are scanned collectively and the image of two pages is displayed on the display (CRT) 21 at the same time.

This is illustrated in FIGS. 35 and 36. FIG. 35 stands for a left-side paging book and FIG. 36 stands for a right-side paging book. An image ordinary displayed on the display (CRT) 21 is shown at a display example (2). Each time an unrepresented next key is depressed, the first and second pages are changed to the next pages. If the preview division key 50999 is depressed, an image ordinarily shown at a display example (1) is displayed. The display examples (1) and (2) can be interchanged by depressing the preview division key 50999. A printed image is shown at the lower area of FIG. 35.

<Serial Page Copy in DF Mode>

In the DF mode, generally an original set on DF 11 is read and processed from the last page in the descending order and images are printed out on recording sheets. However, in the serial page copy mode, the original set on DF 11 is printed out in the unit of half size of the original. Specifically, if an A3 size original is set on DF 11 and the serial page copy mode is set, an A4 size image of two pages are formed. Also in this case, the operator is required to designate in advance whether the book original is of left- or right-side paging, and the apparatus operates to change the image reading order in accordance with the operator's setting, similar to the book mode. Namely, in the case of left-side paging, the image reading order is from left to right, whereas in the case of right-side paging, the image reading order is from right to left.

As the operator depresses the serial page copy key 50907, similar to the book mode, a serial page copy operation is executed. In this case, an image is displayed at the same time on the display (CRT) 21 in the same order of actually copying pages.

Similar to the book mode, for the display of the preview image, the operator establishes the serial page copy function and depresses the preview mode key 50105 without depressing the copy start key 50001, to thereby display the preview operation screen. In this state, when the preview start key 50201 is depressed, the preview image is displayed on the display (CRT) 21.

The order of the preview image on the display (CRT) 21 is the descending order from the last page, similar to the copy operation.

If a half size original (A4, B5) is set on DF 11 and the preview division key 50999 and preview start key 50201 on the preview operation screen are depressed, a plurality of pages of an original set on DF 11 are fed to the original support two pages at a time, and the optical system 13 scans the two pages and the preview image of two pages is displayed.

<Two-side Copy Function>

Next, the two-side copy operation will be described.

Figure 38:
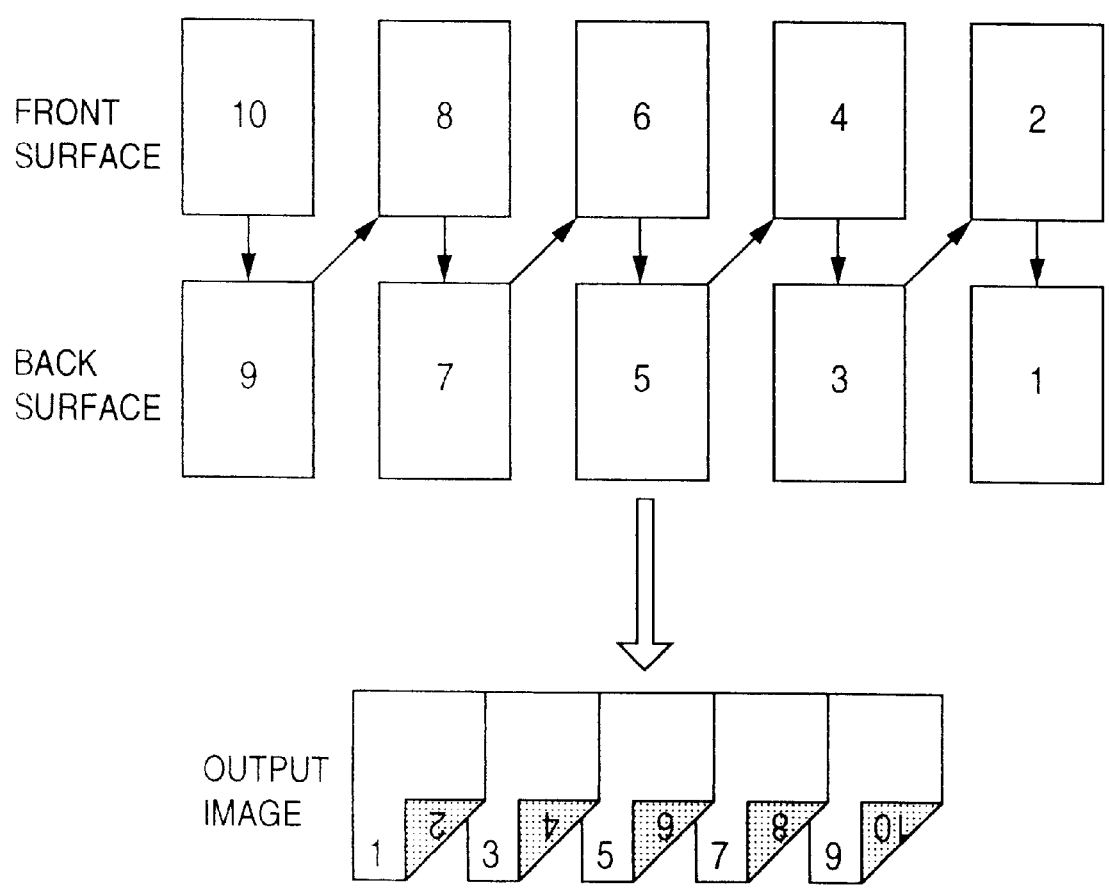

In the image forming apparatus having a mechanism, i.e., a last-in-first-out type two-side mechanism wherein the last recording sheet entered the intermediate tray during the front surface image forming operation is transported first during the back surface image forming operation, it is necessary as shown in FIG. 38, for the two-side copy operation using DF 11 with the number of copies being set to 1, to alternately copy the front and back surfaces of the original of first to tenth pages in the order of tenth, ninth, eighth, . . . , second, and first pages.

Figure 37:
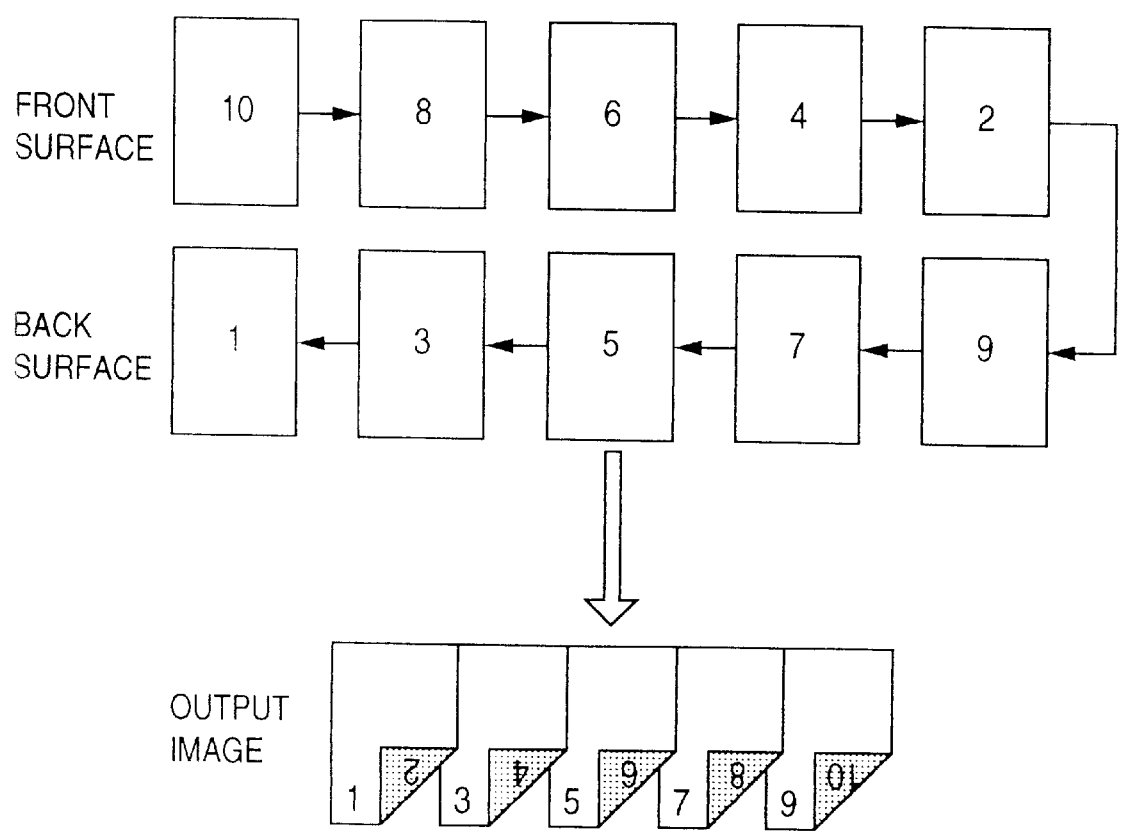
FIGS. 37 and 38 are diagrams illustrating the recording order of two-side copies.

However, in the image forming apparatus having a mechanism, i.e., a first-in-first-out type two-side mechanism wherein the first recording sheet entered the intermediate tray during the front surface image forming operation is transported first during the back surface image forming operation, it is necessary as shown in FIG. 37 to copy the front surfaces of the original of first to tenth pages in the order of tenth, eighth, sixth, fourth, and second and to temporarily store them in the intermediate tray. Next, starting from the tenth page, the recording sheets are sequentially fed to copy the ninth page on the back surface of the tenth page sheet, and then seventh, fifth, third, and first pages.

Although not shown in FIG. 1, if a reverse path is provided at the recording sheet discharge port, a back surface discharge is possible. This mechanism turns upside down the recording sheet which is otherwise discharged in face-up, and switches between face-up and face-down. If the apparatus is provided with this mechanism, an operator is required to select in advance one of the normal or reverse discharge.

<Display on CRT in Two-side Copy>

This operation to be set from the operation unit will be described.

Figure 21:
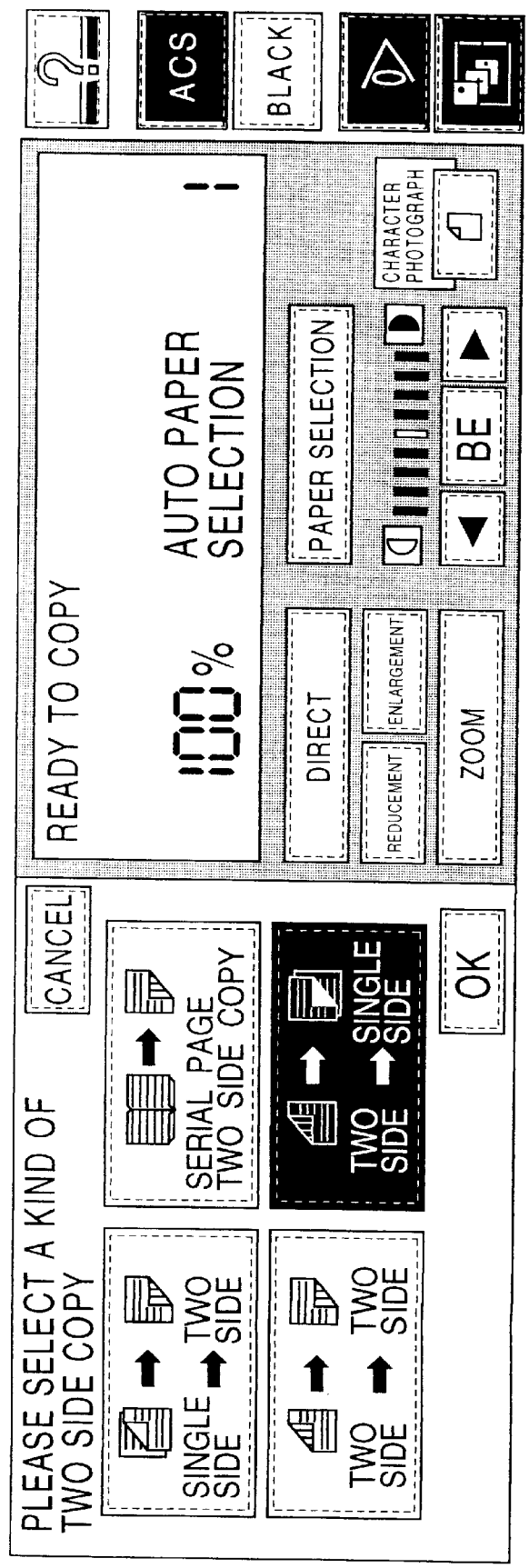
Figure 22:
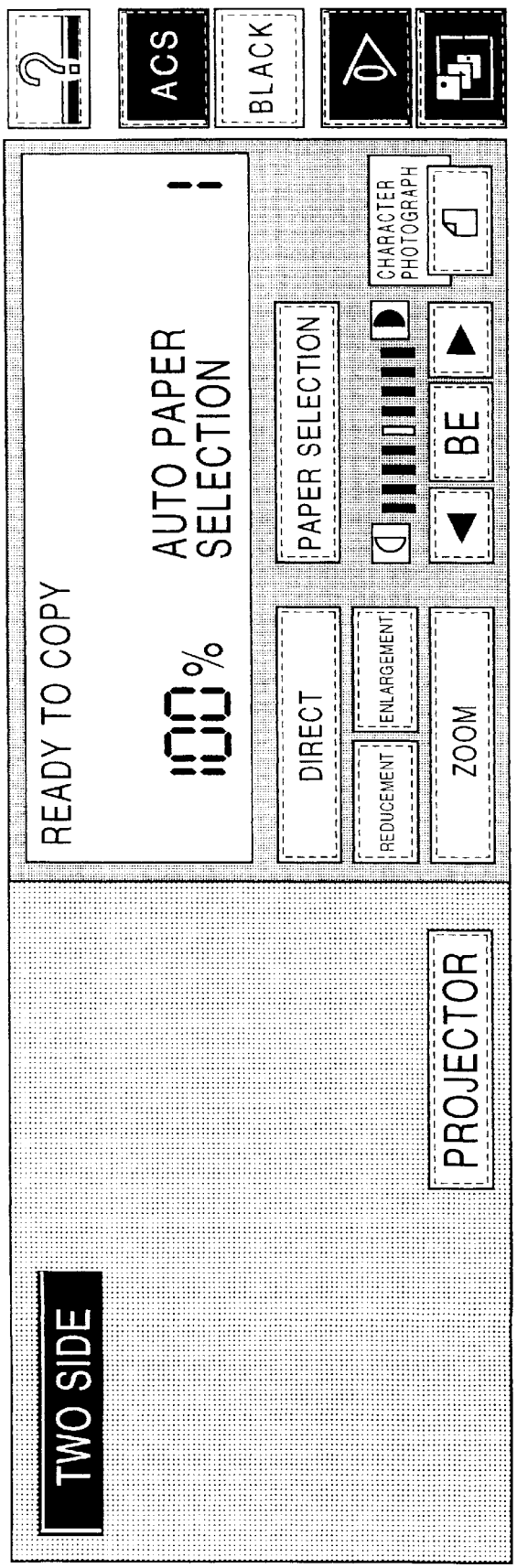
Figure 23:
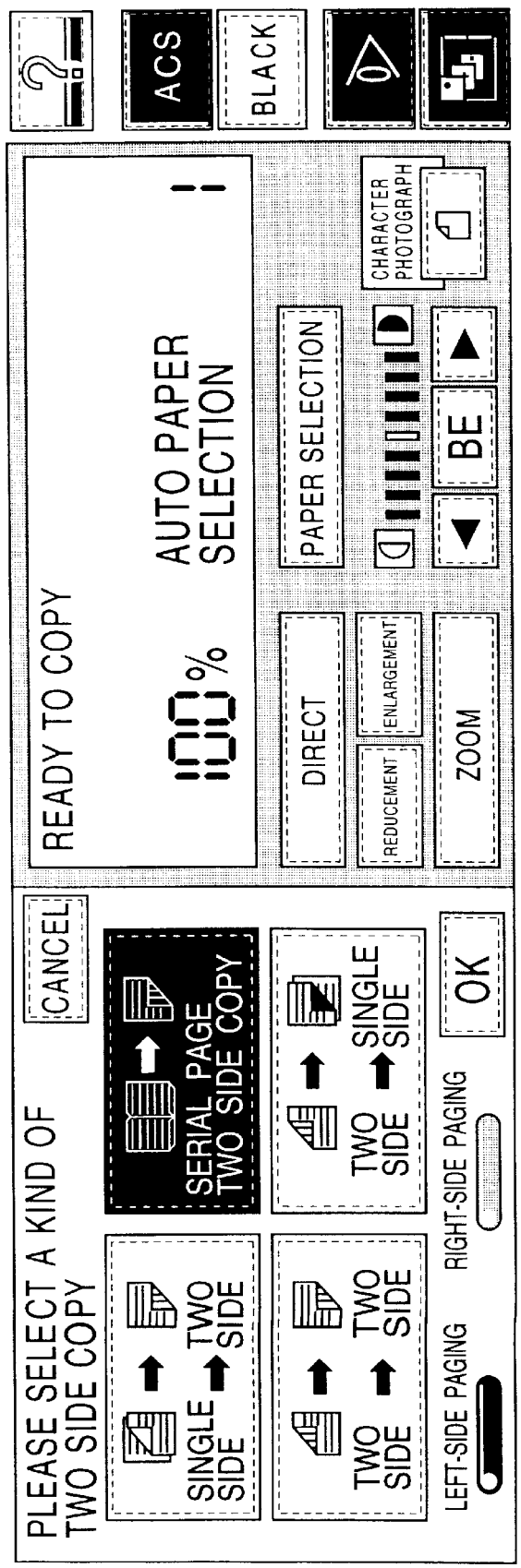
Figure 24:
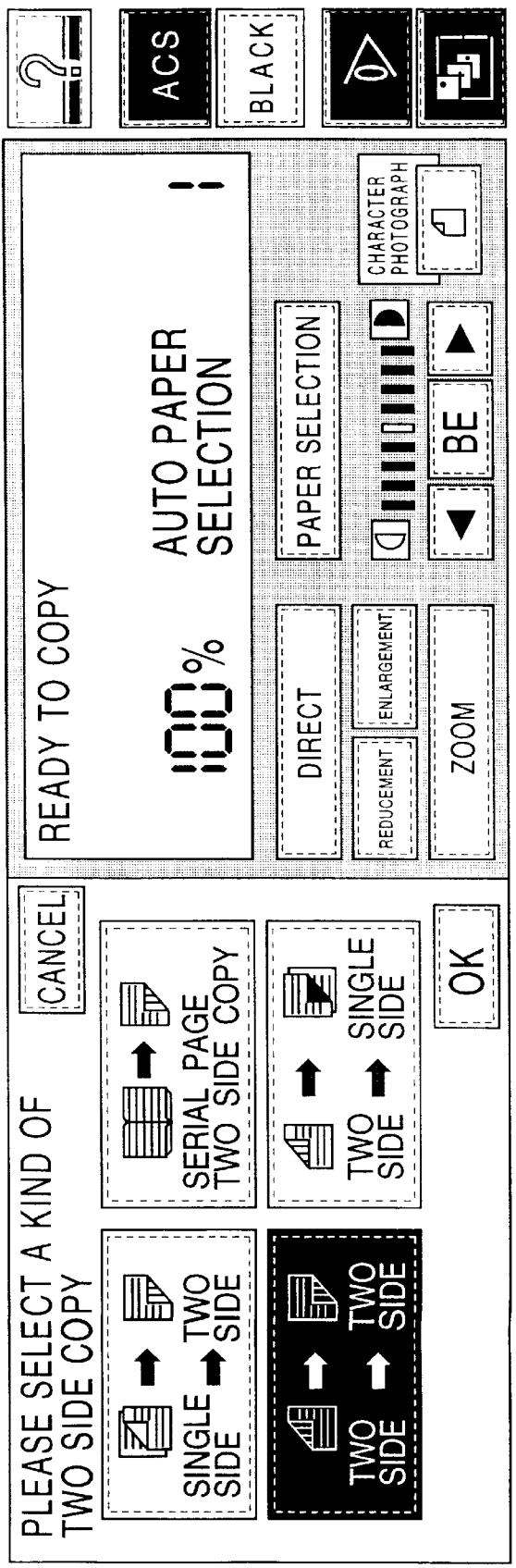

As the operator depresses a both-side key 50901, the operation screen such as shown in FIG. 21 is displayed. As a kind of two-side copy is selected and an OK key is depressed, the two-side copy function is established and the display screen such as shown in FIG. 36 is displayed. In the state shown in FIG. 35, if a serial page copy two-side key is depressed to set a serial page two-side mode, the display screen such as shown in FIG. 23 is displayed to allow the operator to select one of the left- and right-side paging books. If a two-side copy operation for a two-side original is to be performed by using DF 11, a two-side→two-side key shown in FIG. 24 is depressed. In the state shown in FIG. 22, if the copy start key 50001 is depressed, the two-side copy operation is executed. In this case, an image is displayed on the display (CRT) 21 in the order of actually scanning the original.

Specifically, as the two-side copy is set and the copy start key 50001 is depressed, the preview image in the order of tenth, ninth, eighth, . . . , second, and first pages is displayed in the case of the apparatus having the last-in-first-out type two-side mechanism, whereas the preview image in the order of tenth, eighth, sixth, fourth, second, ninth, seventh, fifth, third, and first pages is displayed in the case of the apparatus having the first-in-first-out type two-side mechanism.

Similar to the serial page copy mode, also in the serial page copy two-side mode, the operator designates one of the left- and right-side paging books. For example, in the case of the left-side paging book, first the left side page (second page) is scanned to form an image and this recording sheet is temporarily stored in the intermediate tray. Next, the right side page (first page) is read to form an image on the recording sheet stored in the intermediate tray. As a result, the recording sheet is discharged with the first page in face-up (second page in face-down). In this case, the preview image on the CRT display is displayed in the order of the left side page (second page) and the right side page (first page).

For the setting of the right-side paging book, the scanning order is reversed, and the preview image is displayed in the order of the right side page (second page) and the left side page (first page), and the recording sheet is discharged with the first page in face-up.

In the serial page two-side mode, if an operator wishes to display the preview image on the display (CRT) 21 prior to copying, the serial page copy two-side function is established and the preview mode key 50105 is depressed without depressing the copy start key 50001 to display the preview operation screen. In this state, the preview start key 50201 is depressed to display the preview image on the display (CRT) 21.

If the preview division key 50999 on the preview operation screen is depressed and the preview start key 50201 is depressed, the preview image is displayed on the CRT display in the order of actually reading the original in the unit of two pages, i.e., in the order of tenth and ninth pages, eight and seventh pages, . . . , and second and first pages, in the case of the apparatus having a last-in-first-out type two-side mechanism. However, in the case of the apparatus having a first-in-first-out type two-side mechanism, the preview image is not displayed in the same order of actually copying. Therefore, similar to the DF mode, a plurality of pages of an original set on DF 11 are fed to the original support two pages at a time, the optical system 13 scans the two pages, and the preview image of two pages is displayed at a time.

This is illustrated in FIG. 39 which shows a left-side paging book by way of example. The preview image is indicated at a display example (2). Each time an unrepresented next key is depressed, the front and back surfaces are exchanged. If the preview division key 50999 is depressed next, an image shown at a display example (1) is displayed. The display examples (1) and (2) can be switched by depressing the preview division key 50999. A printed image is shown at the lower area of FIG. 39.

<Display on CRT in Enlargement Serial Copy>

With the enlargement serial copy function, one original is divided into a plurality of blocks, an image of each block is enlarged at a certain magnification by the variable power circuit 234, and the enlarged images of blocks are copied to different recording sheets.

Figure 25:
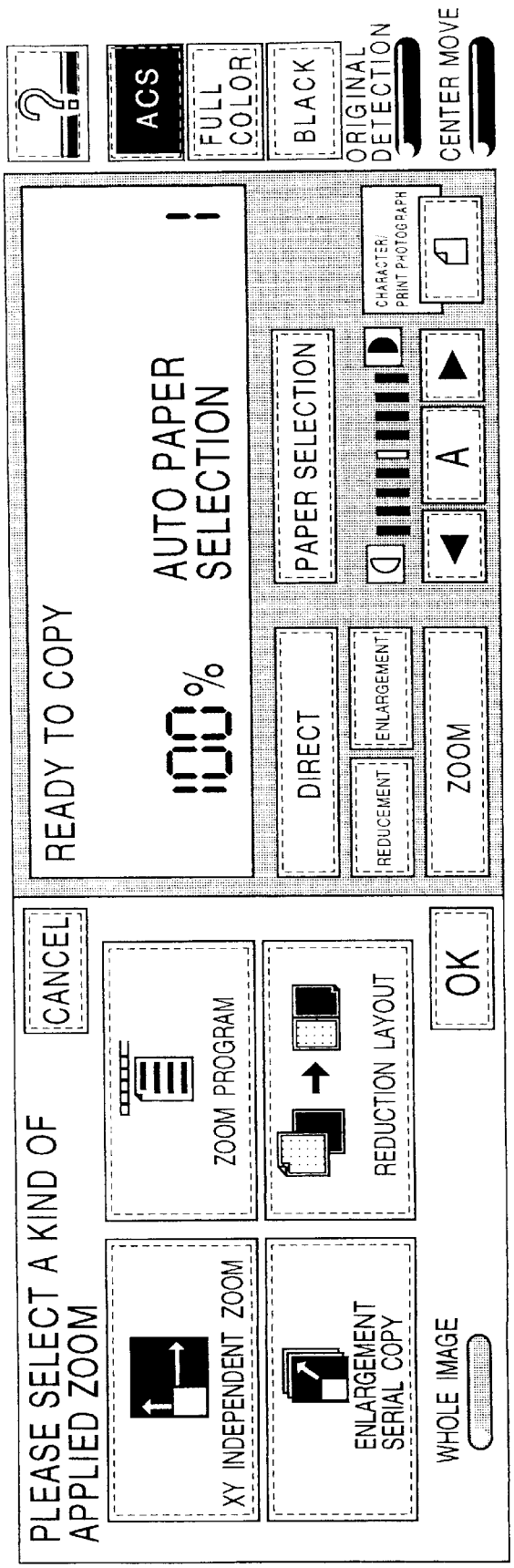
Figure 26:
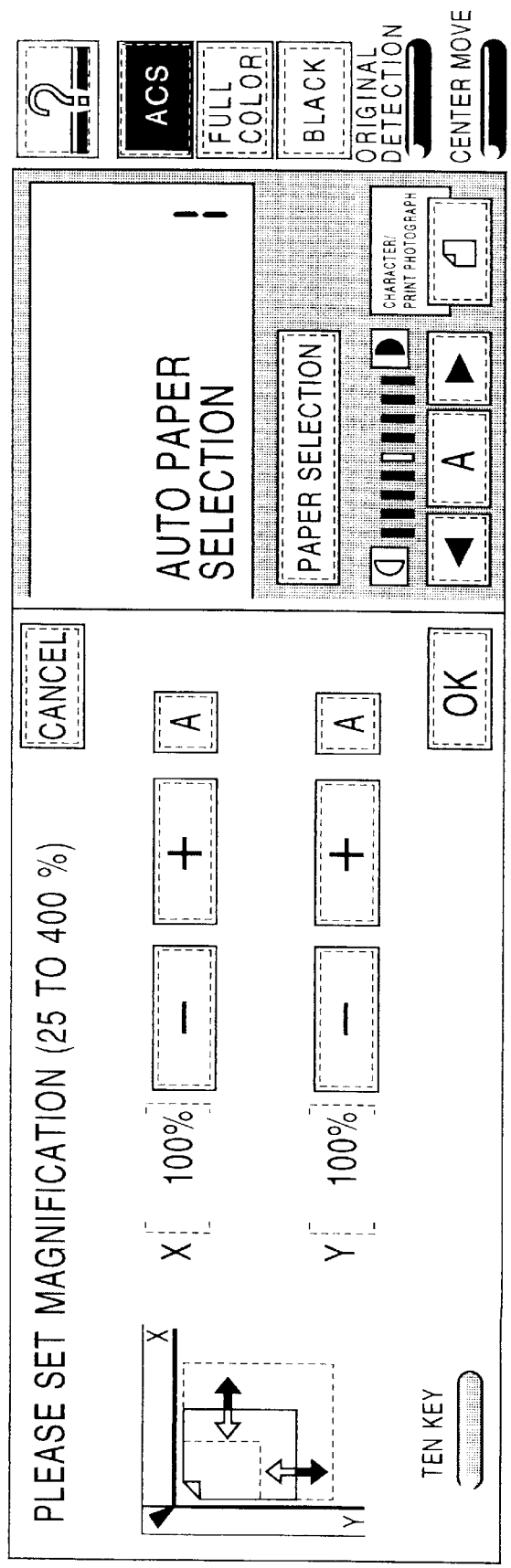
Figure 27:
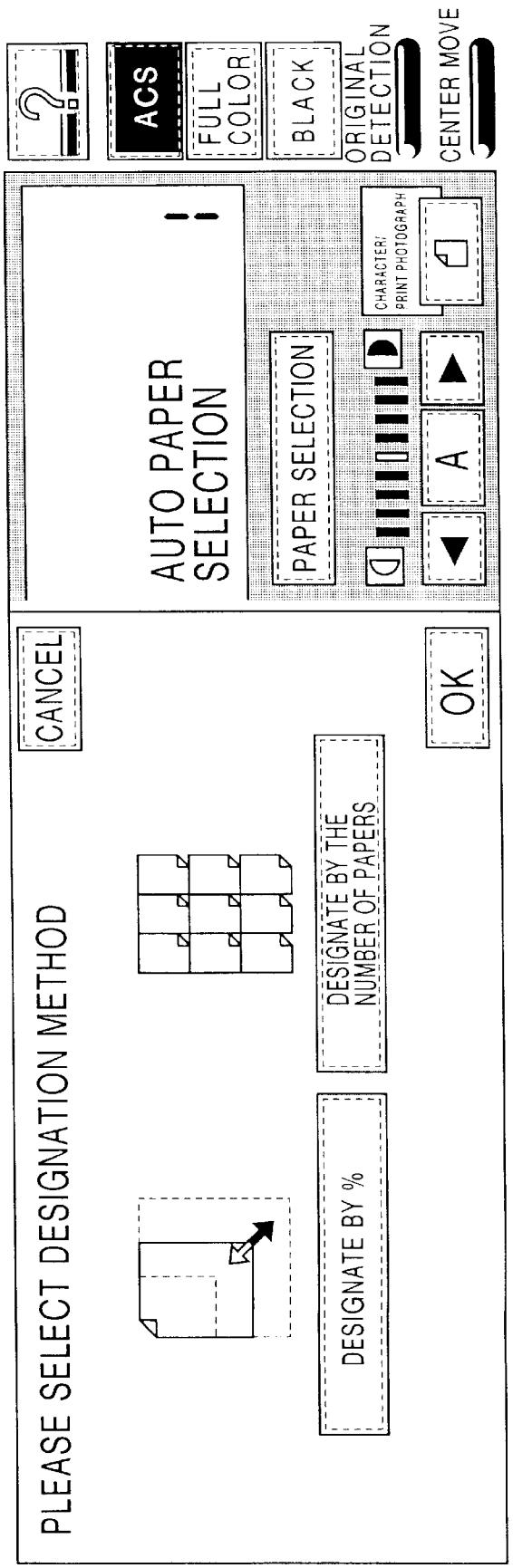
Figure 28:
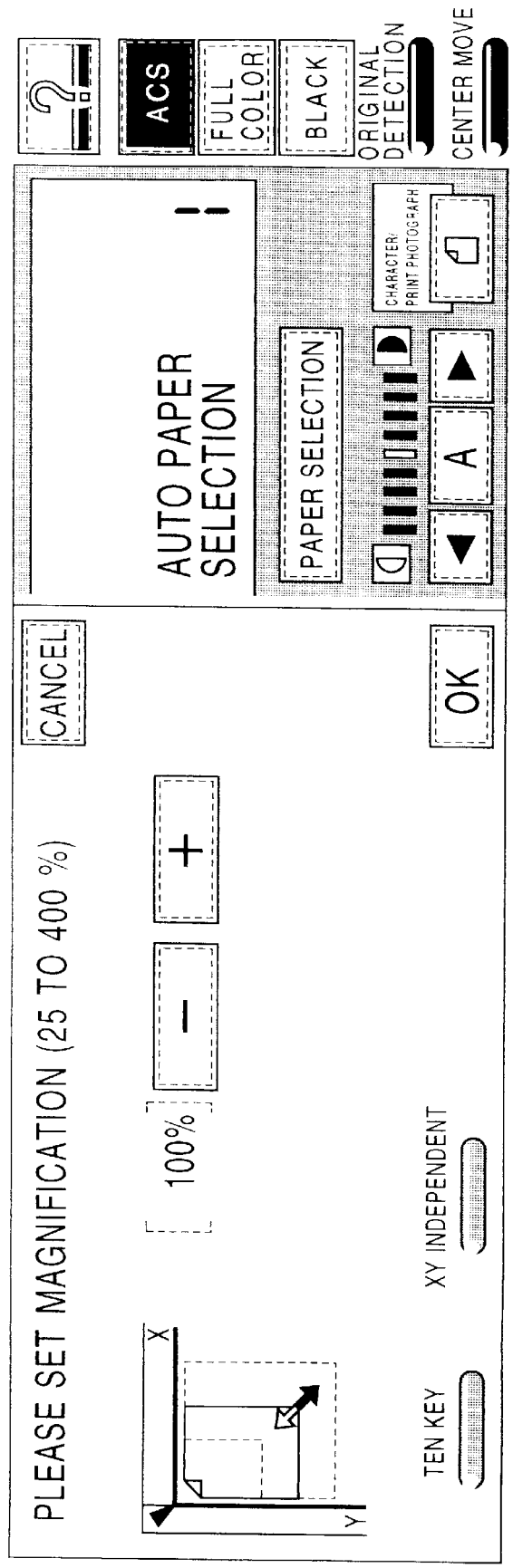
Figure 29:
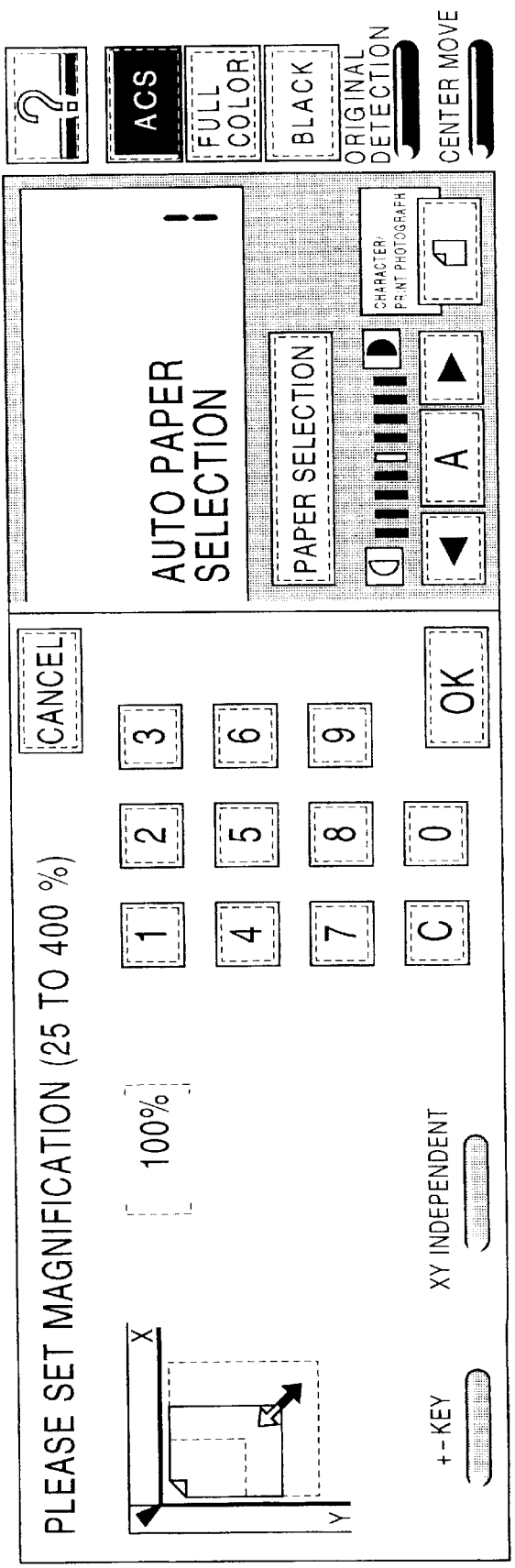
Figure 30:
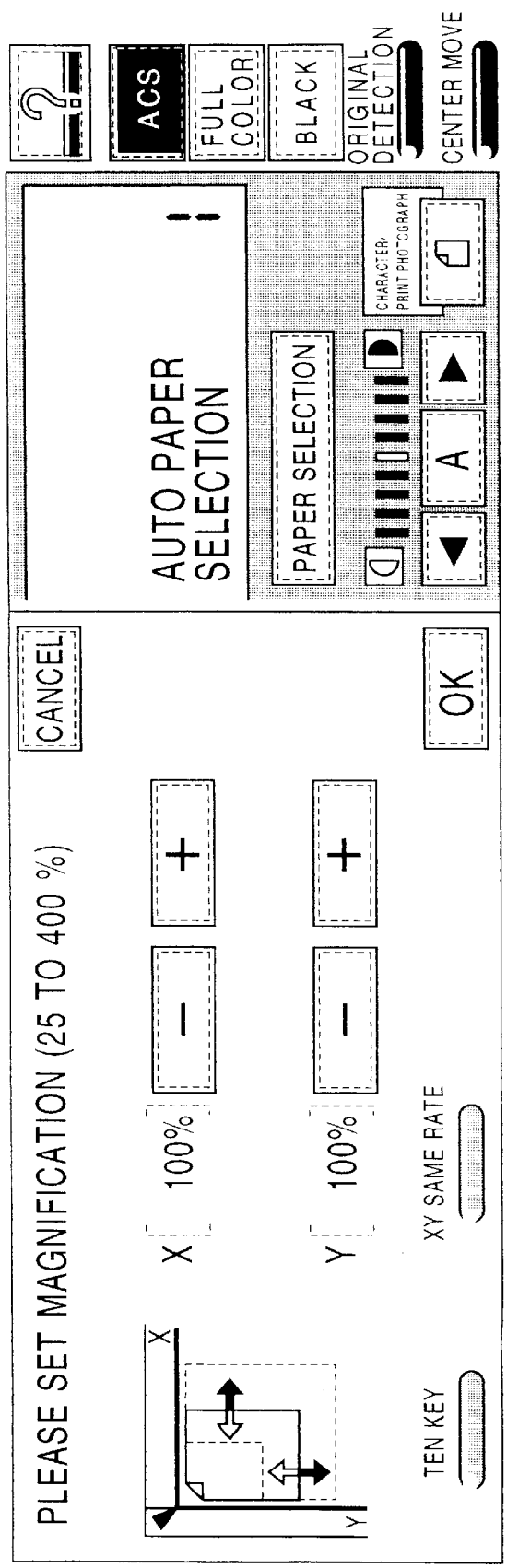
Figure 31:
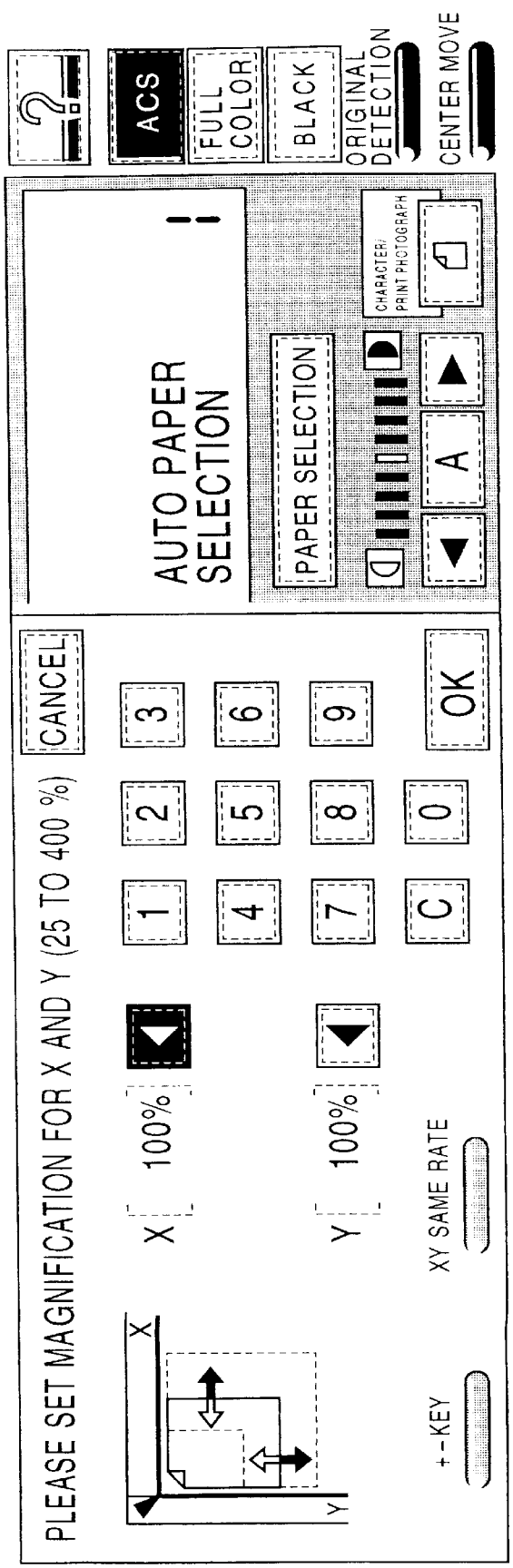
Figure 40:
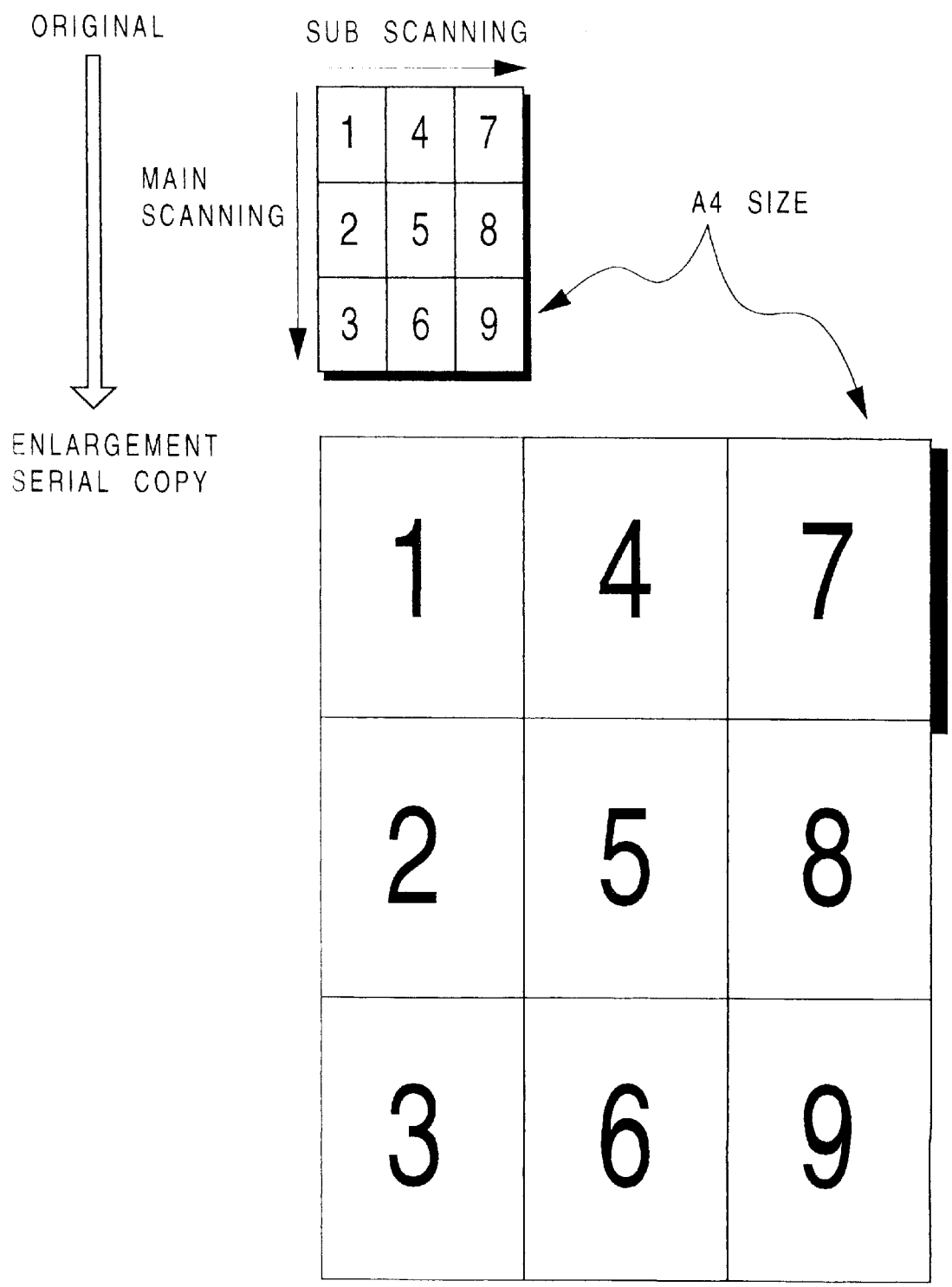
FIG. 40 is a diagram illustrating an enlargement serial copy mode.

An enlargement serial copy of an original image (A4 size) will be illustratively described with reference to FIG. 40. As an applied zoom key 50904 is depressed, the display screen such as shown in FIG. 25 is displayed on the display unit 50004 of the operation unit. As an enlargement serial copy key is depressed, the display screen changes to that shown in FIG. 27. The operator selects whether the enlargement is designated by a percentage or by the number of recording sheets. If a percentage designation is selected, the display screen such as shown in FIG. 28 is displayed. If vertical and horizontal magnifications are the same, this magnification is set by using plus and minus keys. If the magnification is set by a ten-key or if the vertical and horizontal magnifications are set independently, the corresponding key is depressed. If the ten-key input key is depressed, the display screen such as shown in FIG. 29 is displayed. If an XY independent key is depressed, the display screen such as shown in FIG. 30 is displayed. If a magnification is to be entered by the ten-key during the independent magnification setting, the ten-key input key is depressed to display the display screen such as shown in FIG. 31. If the images shown in FIG. 40 are to be printed, the magnification of 300% is set for both the vertical and horizontal magnifications.

After the OK key is depressed to establish the enlargement serial copy function, the reader unit 12 reads the images of nine blocks in the order of first, second, . . . , and ninth blocks. The read image of each block is enlarged at a designated magnification (in this example, 300%) by the variable power circuit 234. The image of the first block enlarged at 300% is printed out on an A4 size recording sheet. The images of respective blocks are sequentially read in the order of second, third, . . . and are enlarged in this order to be printed out on A4 size recording sheets. In this case, an output image is sequentially displayed at the same time on the CRT display 21 in the same order of actually printing the images.

If the preview mode key 50105 is depressed after the enlargement serial copy function is established, the preview division key 50999 is displayed on the preview operation screen (FIG. 11). As the preview start key 50201 is depressed after this key 50999 is depressed, a preview image of all divided images to be printed out on recording sheets is displayed on the CRT.

Figure 41:
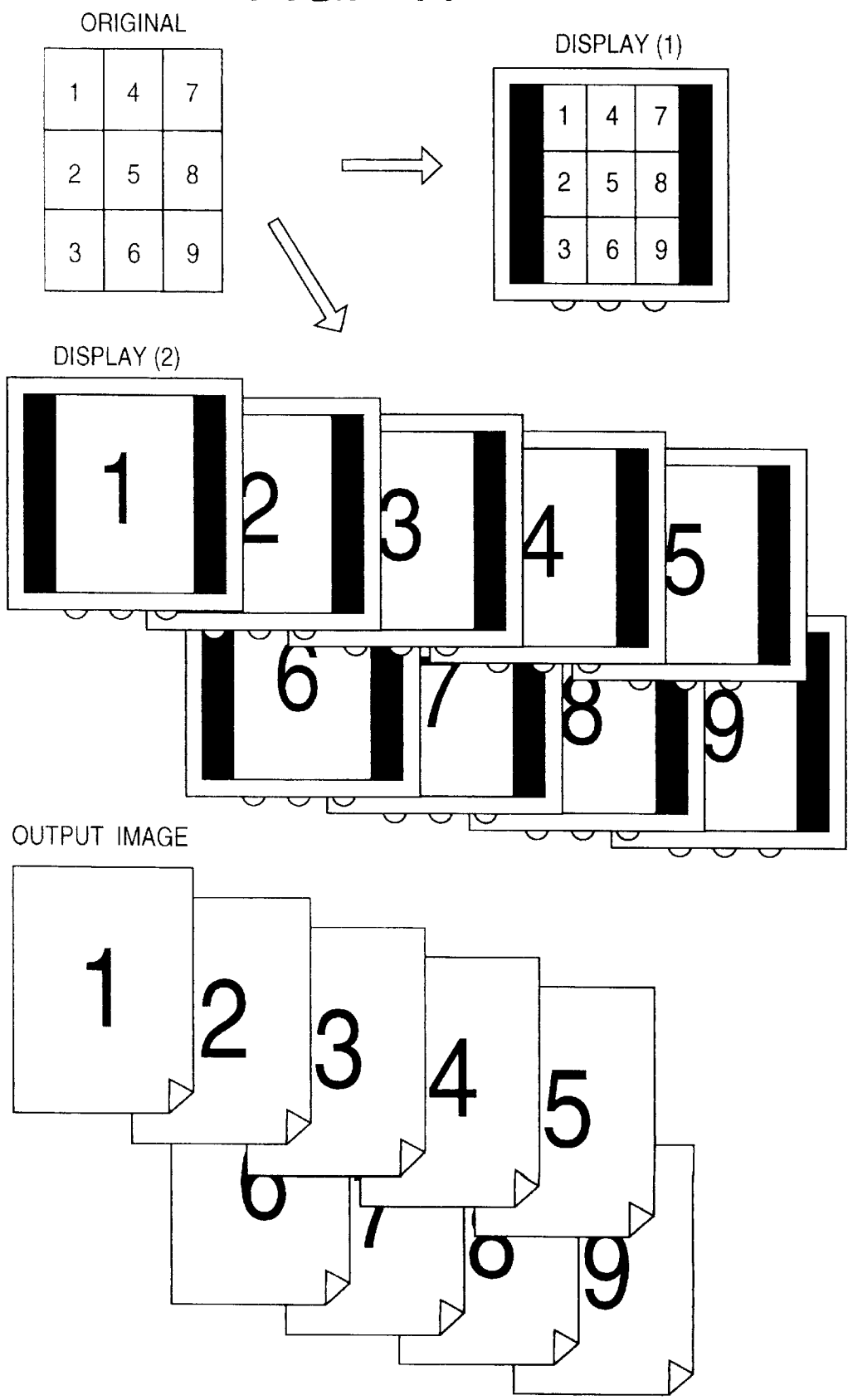
FIG. 41 is a diagram illustrating a preview in the enlargement serial copy mode.

This is illustrated in FIG. 41. The normal preview image is indicated at a display example (2). Each time an unrepresented next key is depressed, the preview image is interchanged between the first to ninth blocks. If the preview division key 50999 is depressed next, an image shown at a display example (1) is displayed. The display examples (1) and (2) can be switched by depressing the preview division key 50999. A printed image is shown at the lower area of FIG. 41.

<Display on CRT in Arbitrary Division>

Next, the arbitrary division function will be described.

With the arbitrary division function, one original is divided into a plurality number of designated blocks, an image of each block is enlarged at a certain magnification by the variable power circuit 234, and the enlarged images of blocks are copied to different recording sheets. A difference between the arbitrary division function and the enlargement serial copy is that the number of vertical and horizontal divisions can be arbitrary. Specifically, with the arbitrary division function, the size of a recording sheet is preset and an original is enlarged at arbitrary vertical and horizontal magnifications to sequentially print out images on different recording sheets having the preset size.

Figure 18:
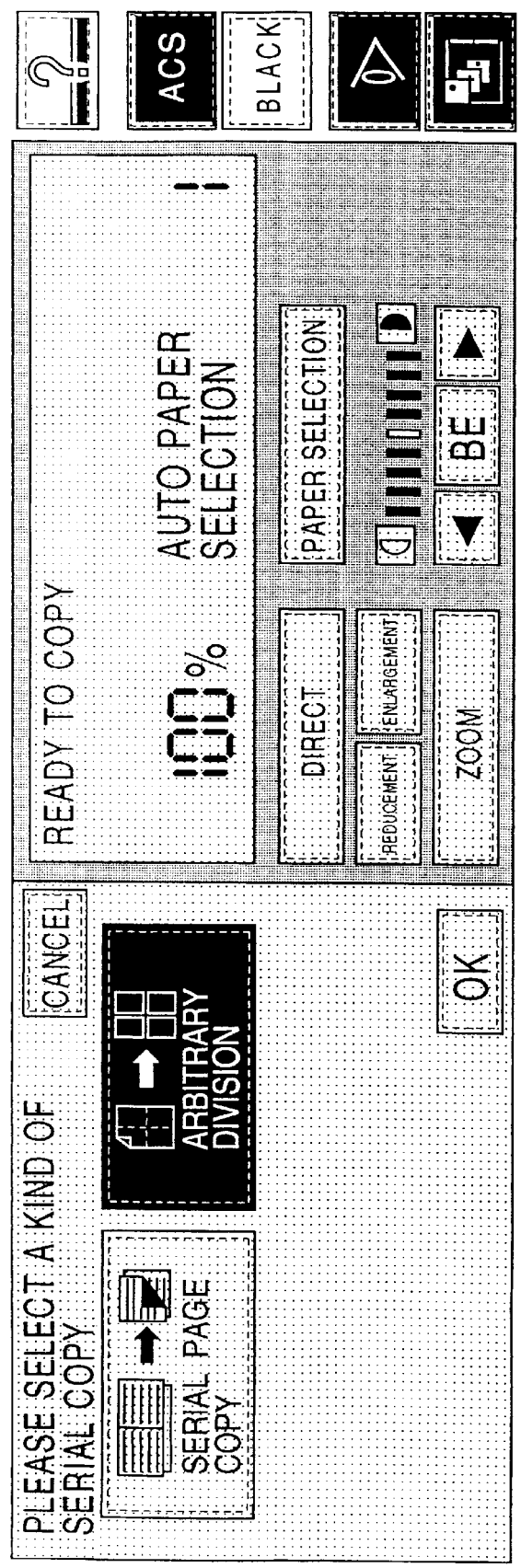
Figure 19:
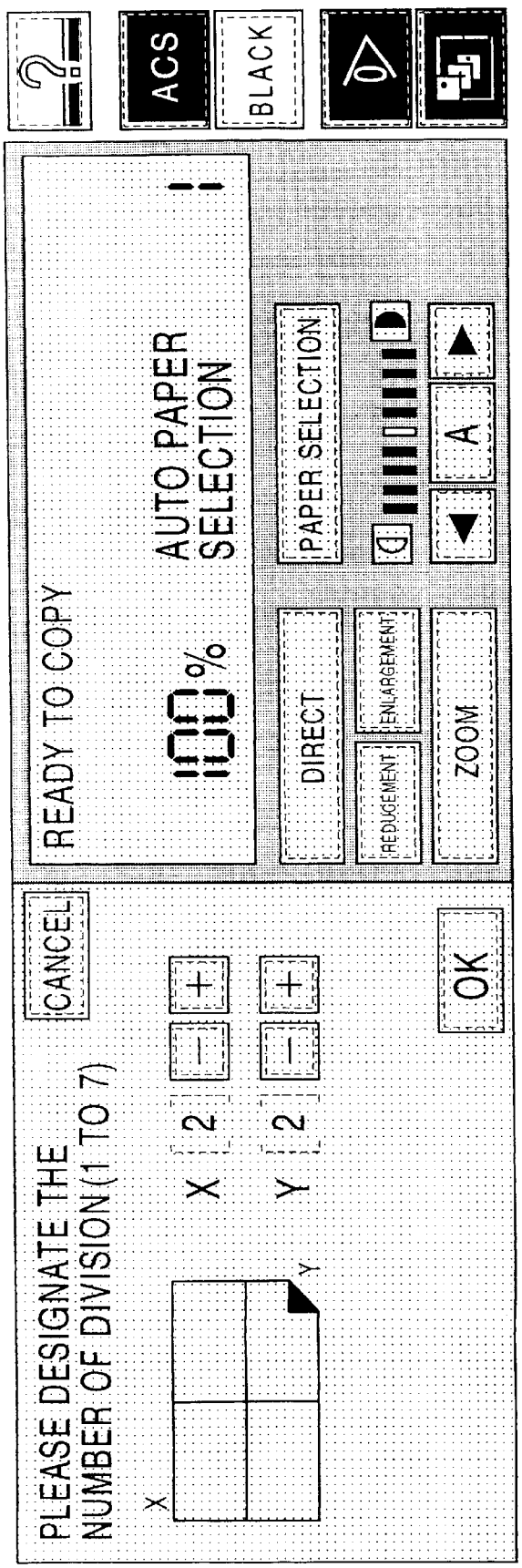
Figure 32:
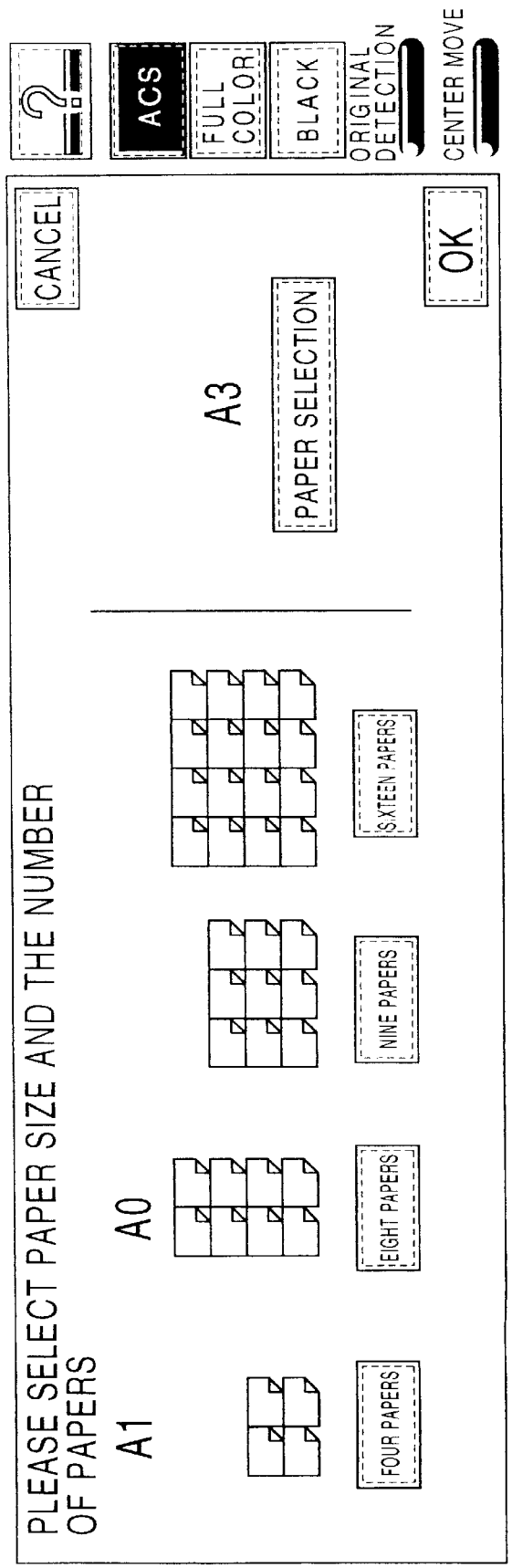
Figure 33:
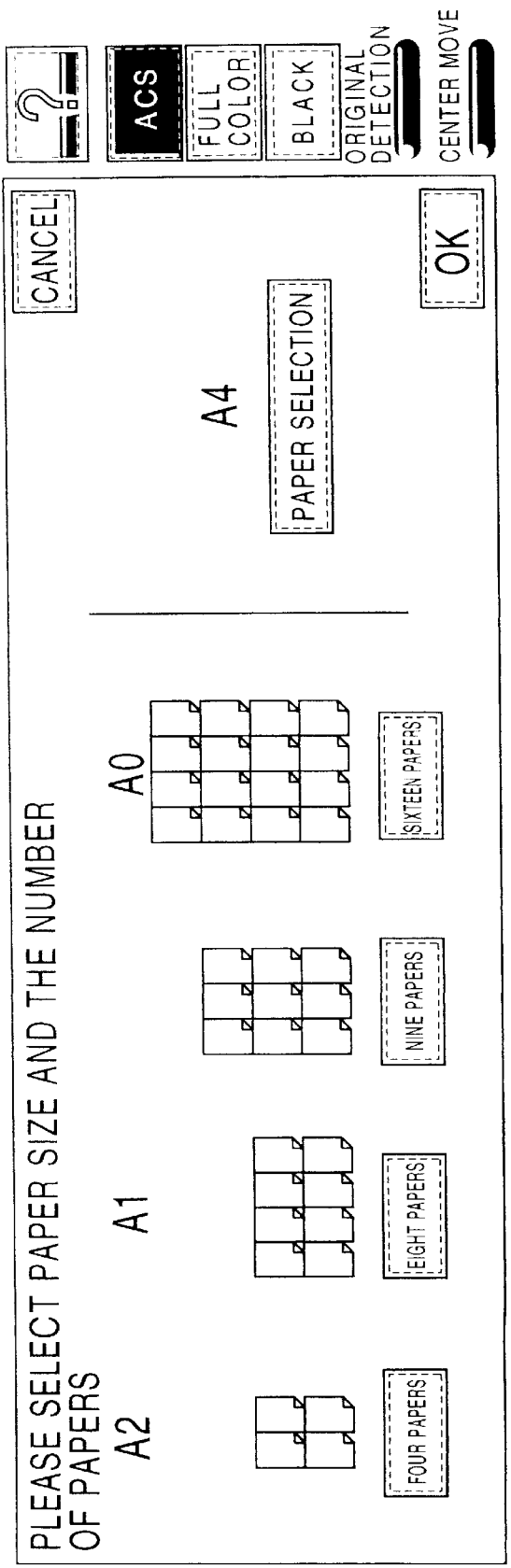
Figure 34:
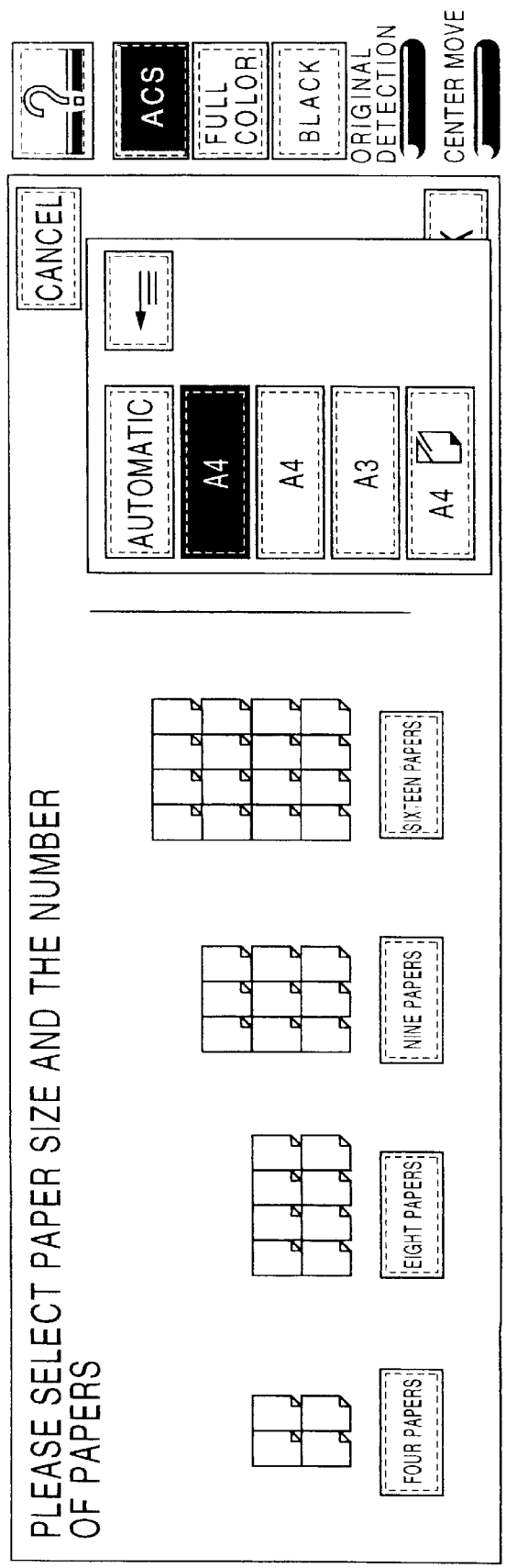

First, as the serial page copy key 50907 on the operation unit (FIG. 9) is depressed, the display screen such as shown in FIG. 18 is displayed on the display unit 50004 of the operation unit. As an arbitrary division key is depressed, the display screen changes to that shown in FIG. 32. The operator selects the size of a recording sheet. FIG. 32 shows the display screen when an A3 size is selected. FIG. 33 shows the display screen when an A4 size is selected. As a paper size selection key is depressed, the display screen changes to that shown in FIG. 34 allowing the operator to select a desired paper size. Next, the operator sets the number of recording sheets. In the example shown in FIG. 32, if the four-paper is selected, the total size of all output images is an A1 size, and if the eight-paper is selected, the total size of all output images is an A0 size.

As the copy start key 50001 is depressed after the OK key is depressed to establish the arbitrary division function, the images of the divided blocks of the original are scanned sequentially, the images are displayed on the CRT display 21 in the order of scanning and the images are output sequentially.

Also, as the preview key 50105 is depressed after the arbitrary division function is established, the preview division key 50999 is displayed on the preview operation screen (FIG. 11). As the preview start key 50201 is depressed after this key 50999 is depressed, a preview image of all divided images to be printed out on recording sheets is displayed on the CRT.

Although not shown, if a variable power circuit is provided at the circuit stage after the display memory 217, the enlarged or reduced images can be displayed.

<Interception of Continuous Display>

Figure 42:
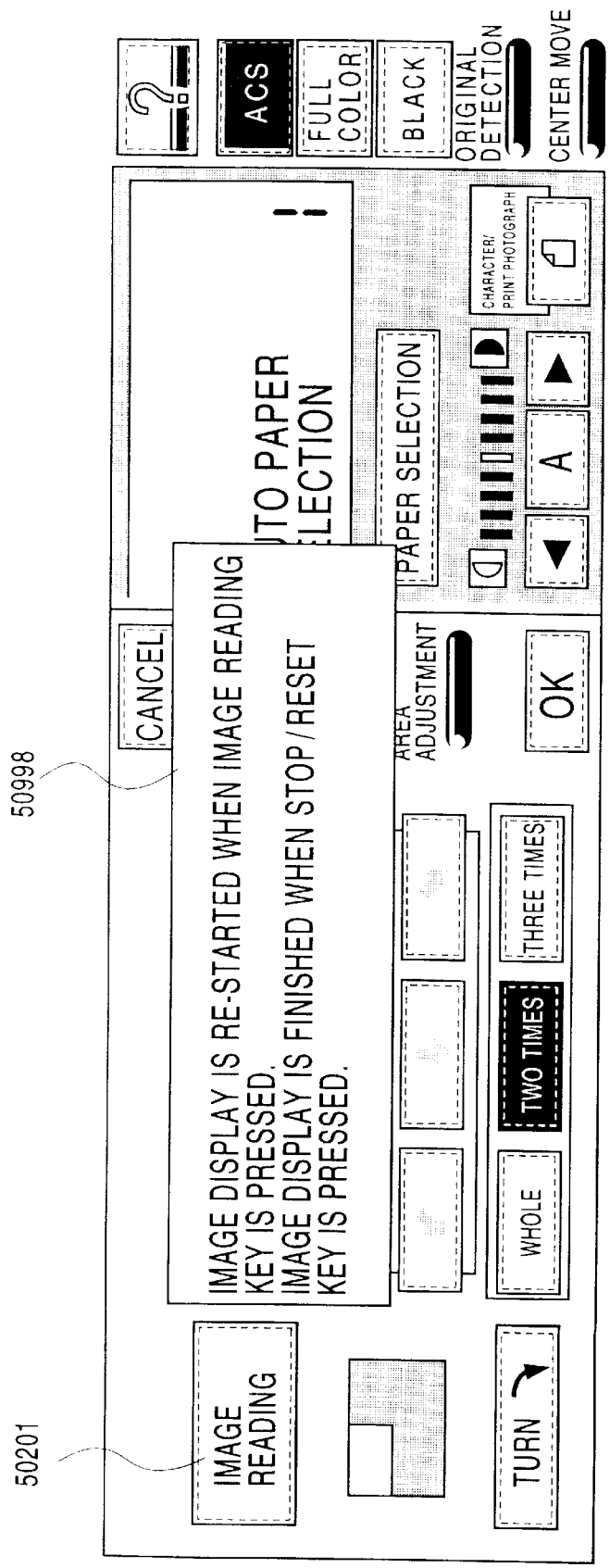
FIG. 42 is a diagram showing a screen of the operation unit when a preview is temporarily interrupted.

During the preview display in a copy mode, a serial page copy mode, a two-side copy mode, an enlargement serial mode, an arbitrary division mode, or the like using DF 11, the preview images are continuously displayed. If the stop key 50002 is depressed during the preview display, the continuous display is temporarily stopped and the screen on the operation unit such as shown in FIG. 42 is displayed and a message indicated at 50998 is shown. If the image reading key 50201 is depressed in this state, reading the remaining page or area of an original starts again to resume the continuous display.

In the state shown in FIG. 42, if the stop key 50002 or reset key 50005 is depressed, the continuous display is terminated even if there is an image still not displayed. If DF is being used in this state, the original still not read is transported in an idle state and the initial stack state of an original is recovered.

By alternately depressing the stop key 50002 and image reading key 50201 in the above manner, the next image display can proceed at a timing desired by the operator.

If the preview display becomes unnecessary, it can be stopped at once.

In the above embodiment, in the preview of the serial page copy mode, the right and left pages are scanned in the same order as the copy operation. Instead, the right and left pages may be collectively scanned irrespective of a designation of right- or left-side paging, and stored in the image memory 208. In this case, in accordance with a designation of right- or left-side paging, the reading address of the image memory 208 is changed to perform the preview.

Figure 43:
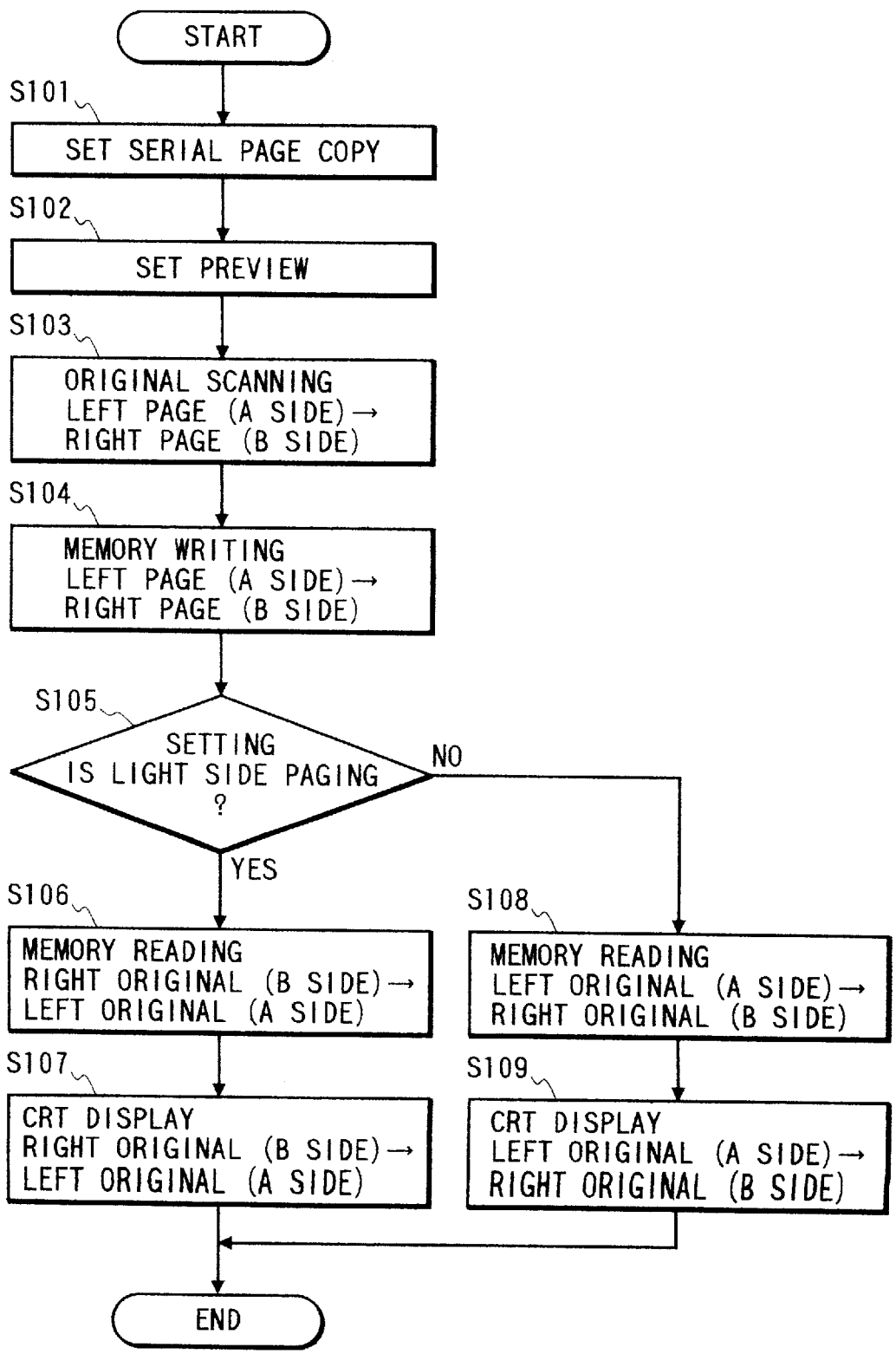
FIG. 43 is a flow chart illustrating the preview process in the serial page copy mode.

This embodiment will be described in detail with reference to FIG. 43.

First, an operator sets a serial page copy mode and a left-/right-side paging by using the operation unit (S101). Next, the preview is set (S102). If the preview is set, irrespective of a designation of left/right-side paging, the original on the original support is scanned from the left (page) to the right (page) to continuously read the left and right pages and store the images in this order in the image memory 208 (S103, S104). Next, it is checked whether the setting is left- or right-side paging (S105). If the setting is left-side paging, data is read from the image memory 208 at the address of the right page and processed and displayed on CRT, and thereafter, data is read from the image memory 208 at the address of the left page and processed and displayed on CRT (S106, S107).

If the setting is right-side paging, data is read from the image memory 208 at the address of the left page and processed and displayed on CRT, and thereafter, data is read from the image memory 208 at the address of the right page and processed and displayed on the CRT (S108, S109).

Similar to the above, also in the preview of the enlargement serial copy mode, the entire image of an original may be stored in the image memory 208. In this case, after the image is read at the image address of each of a plurality of divisional blocks, it is enlarged and displayed on CRT, and this operation cycle is repeated.

The order of reading the images of respective blocks is the same as the order of scanning the images of respective blocks in the copy operation.

The images in the preview may be displayed in the order designated by an operator similar to the enlargement serial copy mode in which the operator can designate the order of printing out the images of respective blocks.

Figure 44:
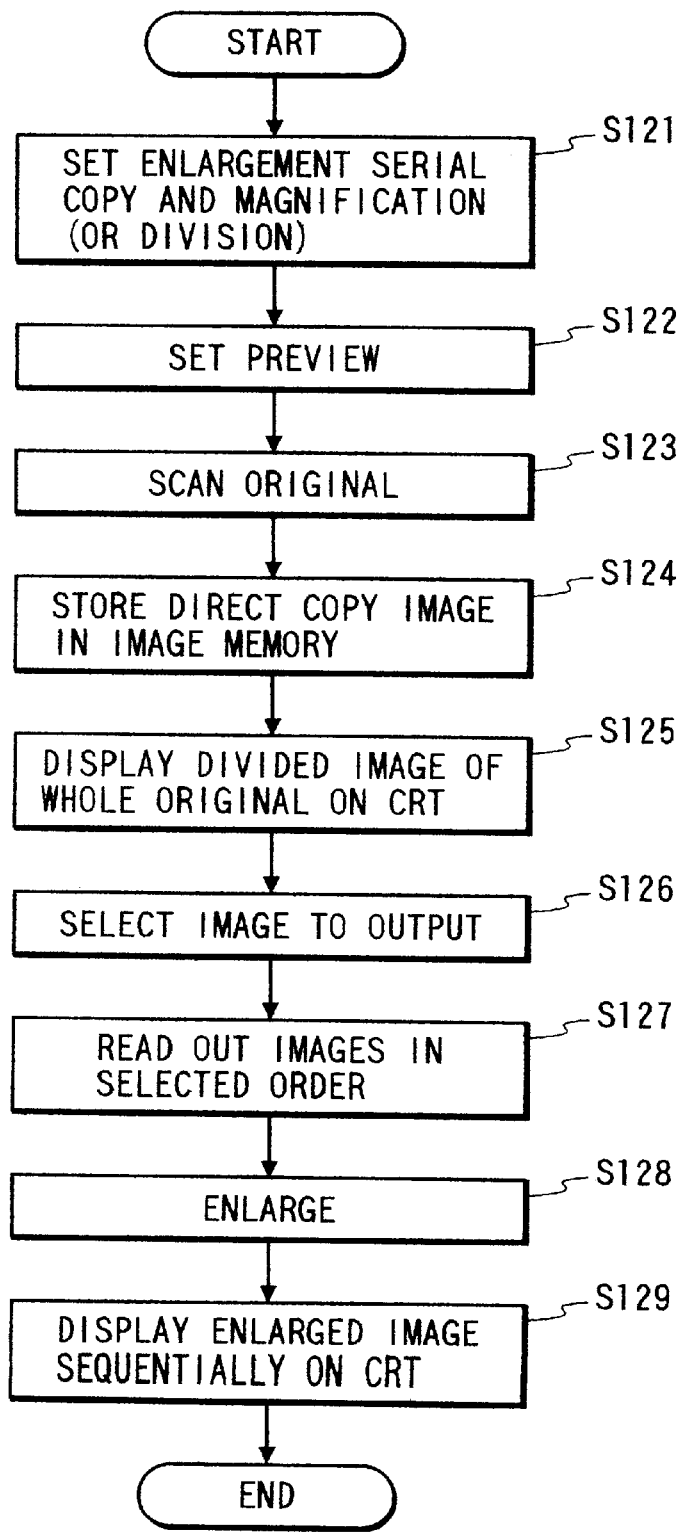
FIG. 44 is a flow chart illustrating the preview process in the enlargement serial copy mode.
Figure 45:
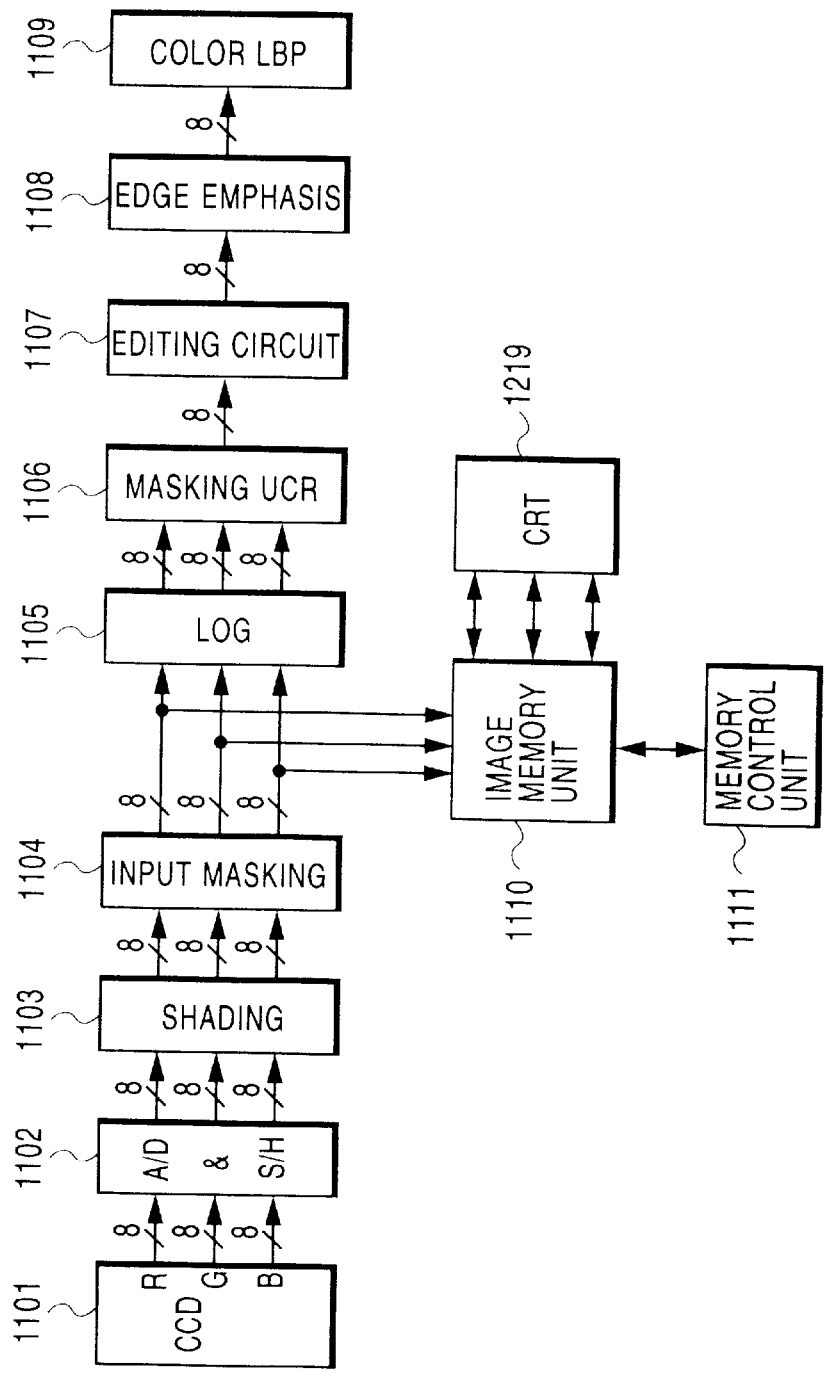
FIG. 45 is a diagram showing a conventional preview system.

This embodiment will be described in detail with reference to FIG. 44. First, an operator designates an enlargement serial copy mode and a magnification or the number of divisional blocks (S121). A preview is set (S122). The entire image of an original is scanned (S123) to store it in the image memory 208 at a unity magnification (S124). The entire image of the original together with a frame defining each divisional block is displayed on CRT (S125). While viewing the displayed images, the operator designates the order of outputting the images of respective divisional blocks. In accordance with the designated order, data is read from the image memory 208 (S127) and enlarged by the variable power circuit 235 (S128) to display a preview image on CRT (S129). Reading data from the image memory 208, enlarging and displaying it is repeated for each block.

The invention is not limited to only the above embodiments, but various modifications are possible without departing from the scope of appended claims.

What is claimed is:

1. An image forming apparatus comprising:
   reading means for reading an image of an original;
   mode setting means for setting an image forming mode for the image of the original read by said reading means and a parameter in the image forming mode;
   processing means for processing the image of the original read by said reading means in accordance with the image forming mode set by said mode setting means;
   image forming means for forming the image processed by said processing means on a recording sheet; and
   preview means for displaying on a display unit the image processed by said processing means without forming the image on the recording sheet,
   wherein said preview means displays the processed image in the same order of forming images, if the image forming mode set by said mode setting means is a specific mode in which an order of forming images is changed according to a content of the parameter.

2. An image forming apparatus according to claim 1, wherein said specific mode is a mode of continuously forming different images on at least two recording sheets.

3. An image forming apparatus according to claim 1, wherein said specific mode is a mode of continuously forming the images of right and left pages of an opened book original.

4. An image forming apparatus according to claim 1, wherein said specific mode is a mode of dividing the original into a plurality of blocks, enlarging an image of each block, and forming each image on a different recording sheet.

5. An image forming apparatus according to claim 1, wherein said specific mode is a mode of forming the image of the original on the front and back surfaces of a recording sheet by using an original feeder.

6. An image forming apparatus according to claim 1, further comprising interception instructing means for entering an instruction of temporarily intercepting a continuous display, by said preview means, of a plurality of processed images.

7. An image forming apparatus according to claim 6, further comprising resume instructing means for entering an instruction of resuming the continuous display intercepted upon an input from said interception instructing means.

8. An image forming apparatus according to claim 6, wherein said preview means terminates the continuous display if said interception instructing means enters a further input under the condition that the continuous display is being intercepted.

9. An image forming apparatus comprising:
   reading means for reading an image of an original;
   mode setting means for setting an image forming mode for the image of the original read by said reading means;
   processing means for processing the image of the original read by said reading means in accordance with the image forming mode set by said mode setting means;
   image forming means for forming the image processed by said processing means on a recording sheet; and
   preview means for displaying on a display unit the image processed by said processing means without forming the image on a recording sheet,
   wherein said preview means concurrently displays a plurality of processed images to be continuously formed, if the image forming mode set by said mode setting means is a specific mode of continuously forming at least two different images on different surfaces of recording sheets.

10. An image forming apparatus according to claim 9, wherein said specific mode is a mode of continuously forming different images on at least two recording sheets.

11. An image forming apparatus according to claim 9, wherein said specific mode is a mode of continuously forming the images of right and left pages of an opened book original.

12. An image forming apparatus according to claim 9, wherein said specific mode is a mode of dividing the original into a plurality of blocks, enlarging an image of each block, and forming each image on a different recording sheet.

13. An image forming apparatus according to claim 9, wherein said specific mode is a mode of forming the image of the original on the front and back surfaces of a recording sheet by using an original feeder.

14. An image forming apparatus comprising:

reading means for reading an image of an original;

mode setting means for setting an image forming mode for the image of the original read by said reading means;

processing means for processing the image of the original read by said reading means in accordance with the image forming mode set by said mode setting means;

image forming means for forming the image processed by said processing means on a recording sheet;

preview means for displaying on a display unit the image processed by said processing means without forming the image on a recording sheet; and switching means for switching between a first mode and a second mode, said first mode displaying a plurality of processed images one image at a time in the same order of forming an image and said second mode displaying the plurality of processed images at the same time, if the image forming mode set by said mode setting means is a specific mode of continuously forming at least two kinds of images.

15. An image forming method used with an image forming apparatus having: reading means for reading an image of an original; mode setting means for setting an image forming mode for the image of the original read by said reading means and a parameter in the image forming mode; processing means for processing the image of the original read by said reading means in accordance with the image forming mode set by said mode setting means; image forming means for forming the image processed by said processing means on a recording sheet; and preview means for displaying on a display unit the image processed by said processing means without forming the image on a recording sheet, the image forming method comprising the steps of:

a) setting an image forming mode;

b) setting a parameter in the image forming mode set in said step a):

c) setting a preview mode;

d) reading an original image;

e) processing the read original image in accordance with the set image forming mode; and f) displaying a plurality of images processed in said step e) in the same order of forming images by said preview means, if the set image forming mode is a specific mode in which an order of forming images is changed according to a content of the parameter.

16. An image forming method according to claim 15, wherein a continuous display in said step f) is temporarily interrupted in response to an input of an interruption command from an operator.

17. An image forming method according to claim 16, wherein the temporarily intercepted continuous display is resumed in response to an input of a resumption command by the operator.

18. An image forming method according to claim 15, wherein said specific mode is a mode of continuously forming different images on at least two recording sheets.

19. An image forming method according to claim 15, wherein said specific mode is a mode of continuously forming the images of right and left pages of an opened book original.

20. An image forming method according to claim 15, wherein said specific mode is a mode of dividing an original into a plurality of blocks, enlarging an image of each block, and forming each image on a different recording sheet.

21. An image forming method according to claim 15, wherein said specific mode is a mode of forming the image of the original on the front and back surfaces of a recording sheet by using an original feeder.

22. An image forming method used with an image forming apparatus having: reading means for reading an image of an original; mode setting means for setting an image forming mode for the image of the original read by said reading means; processing means for processing the image of the original read by said reading means in accordance with the image forming mode set by said mode setting means; image forming means for forming the image processed by said processing means on a recording sheet; and preview means for displaying on a display unit the image processed by said processing means without forming the image on a recording sheet, the image forming method comprising the steps of:

a) setting an image forming mode;

b) setting a preview mode;

c) reading an original image;

d) processing the read original image in accordance with the set image forming mode; and e) displaying concurrently a plurality of image processed in said step d) on the display unit, if the set image forming mode is a specific mode of continuously forming at least different images on different surfaces of recording sheets.

23. An image forming method according to claim 22, wherein said specific mode is a mode of forming the image of the original on the front and back surfaces of a recording sheet by using an original feeder.

24. An image forming method according to claim 22, wherein said specific mode is a mode of continuously forming the images of right and left pages of an opened book original.

25. An image forming method according to claim 22, wherein said specific mode is a mode of dividing the original into a plurality of blocks, enlarging an image of each block, and forming each image on a different recording sheet.

26. An image forming method used with an image forming apparatus having: reading means for reading an image of an original; mode setting means for setting an image forming mode for the image of the original read by said reading means; processing means for processing the image of the original read by said reading means in accordance with the image forming mode set by said mode setting means; image forming means for forming the image processed by said processing means on a recording sheet; and preview means for displaying on a display unit the image processed by said processing means without forming the image on a recording sheet, the image forming method comprising the steps of:

a) setting an image forming mode;

b) setting a preview mode;

c) reading an original image;

d) processing the read original image in accordance with a set image forming mode;

e) displaying a plurality of images processed in said step d) on the same screen of the display unit at the same time, if the set image forming mode is a specific mode of continuously forming at least two kinds of images; and f) selectively switching between a first mode and a second mode in response to an input of a display switching command from an operator, said first mode displaying a plurality of images processed in said step d) in the same order of forming images and said second mode displaying the plurality of images processed in said step d) at the same time, if the set image forming mode is a specific mode of continuously forming at least two kinds of images.

27. An image forming apparatus comprising:

reading means for reading an image of an original;

mode setting means for setting a mode for dividing the original into a plurality of areas, and forming images of the divided areas, of the original read by said reading means respectively on different recording sheets;

processing means for determining the plurality of divided areas of the original to be read by said reading means, and processing the images of the divided areas of the original read by said reading means, in accordance with the mode set by said mode setting means;

image forming means for forming the images of areas processed by said processing means on different recording sheets, respectively; and preview means for displaying on a display unit the image of each area processed by said processing means without forming the image on the recording sheet, wherein said preview means displays the images of the divided areas of the original to be divided and formed on the different recording sheets and executes a display for causing to recognize boundaries of the divided areas to be able to recognize how the original image is divided and subjected to image forming on the respectively different recording sheets, and wherein said image forming means performs the image forming on the respectively different recording sheets on a basis of the displayed contents by said preview means.

28. An apparatus according to claim 27, wherein said preview means concurrently displays the processed images of the areas.

29. An apparatus according to claim 27, wherein the display representing the division status of the input original is executed in response to an operator's instruction.

30. An image forming method comprising the steps of:

a) causing to set a mode for dividing an original into a plurality of areas, and forming images of the divided areas of the read original respectively on different recording sheets;

b) causing to determine the plurality of divided areas of the original to be read, in accordance with the mode set in said step a);

c) causing to process the images of the divided areas of the read original d) causing the processed images of the areas to be formed on different recording sheets, respectively; and e) displaying the images of the divided areas of the original to be divided and formed on the different recording sheets and causing to recognize boundaries of the divided areas to be able to recognize how the original image is divided and subjected to image forming on the respectively different recording sheets.

31. A method according to claim 30, wherein said step e) causes the processed image of the areas to be concurrently displayed.

32. A method according to claim 30, wherein said step e) is executed in response to an operator's instruction.

* * * * *

UNITED STATES PATENT AND TRADEMARK OFFICE
CERTIFICATE OF CORRECTION

PATENT NO. : 6,281,983 B1  Page 1 of 1
DATED : August 28, 2001
INVENTOR(S) : Hiroyuki Takahashi et al.

It is certified that error appears in the above-identified patent and that said Letters Patent is hereby corrected as shown below:

<u>Title page, Item [54] and Column 1, line 1,</u>
"PREVENTING" should read -- PREVIEWING --.

<u>Column 2,</u>
Line 45, "cross sectional" should read -- cross-sectional --.

<u>Column 3,</u>
Line 39, "sheet and," should read -- sheet, and --.

<u>Column 5,</u>
Line 23, "enable" should read -- enabled --.

<u>Column 6,</u>
Line 31, "If" should read -- In --.

<u>Column 21,</u>
Line 57, "a):" should read -- a); --.

<u>Column 24,</u>
Line 27, "original" should read -- original; --.

Signed and Sealed this

First Day of July, 2003

JAMES E. ROGAN
*Director of the United States Patent and Trademark Office*